United States Patent [19]
Christie et al.

[11] Patent Number: 6,081,525
[45] Date of Patent: Jun. 27, 2000

[54] BROADBAND TELECOMMUNICATIONS SYSTEM

[75] Inventors: Joseph Michael Christie, deceased, late of San Bruno, Calif.; by Jean M. Christie, legal representative; by Joseph S. Christie, legal representative, both of Mt. Pleasant, Pa.; Albert Daniel Duree, Independence, Mo.; Michael Joseph Gardner, Overland Park; William Lyle Wiley, Olathe, both of Kans.; Manu Chand Bahl, Hillsborough, Calif.; Daniel Charles Sbisa, Blue Springs, Mo.

[73] Assignee: Sprint Communications Co., L.P., Kansas City, Mo.

[21] Appl. No.: 08/594,660

[22] Filed: Feb. 2, 1996

(Under 37 CFR 1.47)

Related U.S. Application Data

[63] Continuation-in-part of application No. 08/525,897, Sep. 8, 1995, Pat. No. 5,991,301, which is a continuation-in-part of application No. 08/238,605, May 5, 1994, abandoned, and a continuation-in-part of application No. 08/525,050, Sep. 8, 1995, which is a continuation-in-part of application No. 08/238,605.

[51] Int. Cl.[7] .............................. H04J 3/12; H04L 12/56
[52] U.S. Cl. .......................... 370/392; 370/395; 370/410
[58] Field of Search ..................................... 370/395, 399, 370/397, 389, 392, 400, 409, 474, 352, 410

[56] References Cited

U.S. PATENT DOCUMENTS

| | | |
|---|---|---|
| 4,201,889 | 5/1980 | Lawrence et al. . |
| 4,310,727 | 1/1982 | Lawser . |
| 4,348,554 | 9/1982 | Asmuth . |
| 4,453,247 | 6/1984 | Suzuki et al. . |
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal . |
| 4,823,338 | 4/1989 | Chan et al. . |
| 4,853,955 | 8/1989 | Thorn et al. . |
| 4,896,319 | 1/1990 | Lidinsky et al. . |
| 4,916,690 | 4/1990 | Barri . |
| 4,926,416 | 5/1990 | Weik . |
| 4,985,889 | 1/1991 | Frankish et al. . |
| 4,991,204 | 2/1991 | Yamamoto et al. . |
| 4,993,104 | 2/1991 | Gordon . |

(List continued on next page.)

FOREIGN PATENT DOCUMENTS

| | | |
|---|---|---|
| 90312739 | 7/1991 | European Pat. Off. . |
| 91303312 | 10/1991 | European Pat. Off. . |
| 91311342 | 7/1992 | European Pat. Off. . |
| 92307752 | 9/1993 | European Pat. Off. . |
| 870284896 | 5/1989 | Japan . |
| 07050057 | 9/1996 | Japan . |
| WO94/06251 | 3/1994 | WIPO . |
| WO95/04436 | 2/1995 | WIPO . |

OTHER PUBLICATIONS

1057b U.S. application No. 09/082,165, filed May 20, 1998.
1057c U.S. application No. 09/082,040, filed May 20, 1998.

(List continued on next page.)

*Primary Examiner*—Alpus H. Hsu
*Attorney, Agent, or Firm*—Harley R. Ball

[57] ABSTRACT

The invention is a system for providing virtual connections through an ATM interworking multiplexer on a call-by-call basis. A signaling processor receives signaling for a call and selects the virtual connection for the call. The signaling processor generates control messages that identify the selection and transfers the control messages to the ATM interworking multiplexer that accepted the access connection for the call. The multiplexer converts user information from the access connection into ATM cells for transmission over the virtual connection in accord with the control messages.

9 Claims, 16 Drawing Sheets

U.S. PATENT DOCUMENTS

| | | |
|---|---|---|
| 5,003,584 | 3/1991 | Benyacar . |
| 5,018,191 | 5/1991 | Catron et al. . |
| 5,048,081 | 9/1991 | Gavaras . |
| 5,058,104 | 10/1991 | Yonehara et al. . |
| 5,067,123 | 11/1991 | Hyodo et al. . |
| 5,084,867 | 1/1992 | Tachibana et al. . |
| 5,089,954 | 2/1992 | Rago . |
| 5,091,903 | 2/1992 | Schrodi . |
| 5,101,404 | 3/1992 | Kunimoto et al. . |
| 5,115,431 | 5/1992 | Williams et al. . |
| 5,163,057 | 11/1992 | Grupp . |
| 5,168,492 | 12/1992 | Beshai et al. . |
| 5,185,743 | 2/1993 | Murayama . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyj et al. . |
| 5,233,607 | 8/1993 | Barwig et al. . |
| 5,239,539 | 8/1993 | Uchida et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,895 | 12/1993 | Topper . |
| 5,271,010 | 12/1993 | Miyake . |
| 5,274,680 | 12/1993 | Sorton et al. . |
| 5,278,889 | 1/1994 | Papanicolaou et al. . |
| 5,282,244 | 1/1994 | Fuller et al. . |
| 5,285,441 | 2/1994 | Bansal et al. . |
| 5,291,479 | 3/1994 | Vaziri et al. . |
| 5,306,318 | 4/1994 | Bachhuber et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,327,433 | 7/1994 | Hall . |
| 5,329,308 | 7/1994 | Binns et al. . |
| 5,339,318 | 8/1994 | Tanaka . |
| 5,345,443 | 9/1994 | D'Ambrogio et al. . |
| 5,345,445 | 9/1994 | Hiller . |
| 5,345,446 | 9/1994 | Hiller . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka et al. . |
| 5,375,124 | 12/1994 | D'Ambrogio . |
| 5,377,186 | 12/1994 | Wegner . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | LaPorta . |
| 5,434,981 | 7/1995 | Lenihan et al. . |
| 5,440,563 | 8/1995 | Isidoro et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha et al. ....................... 370/352 |
| 5,463,620 | 10/1995 | Sriram . |
| 5,463,621 | 10/1995 | Suzuki . |
| 5,473,677 | 12/1995 | D'Amato . |
| 5,473,679 | 12/1995 | LaPorta . |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. ............................ 370/399 |
| 5,485,455 | 1/1996 | Dobbins et al. . |
| 5,495,484 | 2/1996 | Self et al. . |
| 5,504,742 | 4/1996 | Kakuma et al. . |
| 5,506,844 | 4/1996 | Rao . |
| 5,509,010 | 4/1996 | LaPorta . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,533,106 | 7/1996 | Blumhardt . |
| 5,539,698 | 7/1996 | Kozaki et al. . |
| 5,539,815 | 7/1996 | Samba . |
| 5,539,816 | 7/1996 | Pinard et al. . |
| 5,539,884 | 7/1996 | Robrock . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,914 | 8/1996 | Clarke et al. . |
| 5,563,939 | 10/1996 | La Porta et al. . |
| 5,566,173 | 10/1996 | Steinbrecher . |
| 5,568,475 | 10/1996 | Doshi et al. ............................ 370/399 |
| 5,570,368 | 10/1996 | Murakami et al. . |
| 5,577,039 | 11/1996 | Won et al. . |
| 5,579,311 | 11/1996 | Chopping et al. . |
| 5,587,999 | 12/1996 | Endo . |
| 5,592,477 | 1/1997 | Farris et al. . |
| 5,600,640 | 2/1997 | Blair et al. . |
| 5,600,643 | 2/1997 | Robrock . |
| 5,627,836 | 5/1997 | Conoscenti et al. ..................... 370/397 |
| 5,629,930 | 5/1997 | Beshair et al. . |
| 5,635,980 | 6/1997 | Lin et al. . |
| 5,636,210 | 6/1997 | Agrawal et al. . |
| 5,640,446 | 6/1997 | Everett et al. . |
| 5,661,725 | 8/1997 | Buck . |
| 5,666,349 | 9/1997 | Petri . |
| 5,673,262 | 9/1997 | Shimizu . |
| 5,680,390 | 10/1997 | Robrock . |
| 5,703,876 | 12/1997 | Christie ................................... 370/395 |
| 5,708,702 | 1/1998 | DePaul et al. . |
| 5,710,769 | 1/1998 | Anderson et al. ....................... 370/355 |
| 5,719,863 | 2/1998 | Hummel . |
| 5,751,706 | 5/1998 | Land . |

OTHER PUBLICATIONS

1057d U.S. application No. 09/082,045, filed May 20, 1998.
1057e U.S. application No. 09/082,048, filed May 20, 1998.
1057f U.S. application No. 09/082,049, filed May 20, 1998.
1057g U.S. application No. 09/082,393, filed May 20, 1998.
1057h U.S. application No. 09/081,166, filed May 20, 1998.
1057i U.S. application No. 09/081,900, filed May 20, 1998.
1057j U.S. application No. 09/081,891, filed May 20, 1998.

1057k U.S. application No. 09/082,181, filed May 20, 1998.
1057l U.S. application No. 09/082,182, filed May 20, 1998.
1057m U.S. application No. 09/082,344, filed May 20, 1998.
1057n U.S. application No. 09/082,180, filed May 20, 1998.
1070 U.S. application No. 08/525,868, filed Sep. 9, 1995.
1070a U.S. application No. 09/116,868, filed Jul. 16, 1998.
1070b U.S. application No. 09/116,966, filed Jul. 16, 1998.
1090 U.S. application No. 08/525,897, filed Sep. 8, 1995.
1098 U.S. application No. 08/525,050, filed Sep. 8, 1995.
1102a U.S. application No. 08/933,297, filed Sep. 19, 1997.
1105 U.S. application No. 08/855,621, filed May 13, 1997.
1110 U.S. application No. 08/594,661, filed Feb. 2, 1996.
1112 U.S. application No. 08/594,662, filed Feb. 2, 1996.
1115 U.S. application No. 08/754,847, filed Nov. 22, 1996.
1116 U.S. application No. 08/754,849, filed Nov. 22, 1996.
1117 U.S. application No. 08/755,268, filed Nov. 22, 1996.
1119 U.S. application No. 08/755,438, filed Nov. 22, 1996.
1121 U.S. application No. 08/653,852, filed May 28, 1996.
1121a U.S. application No. 09/118,604, filed Jul. 17, 1998.
1122 U.S. application No. 08/754,846, filed Nov. 22, 1996.
1122a U.S. application No. 09/080,393, filed May 18, 1998.
1123 U.S. application No. 08/755,523, filed Nov. 22, 1996.
1124 U.S. application No. 08/853,843, filed May 9, 1997.
1128 U.S. application No. 08/754,354, filed Nov. 22, 1996.
1148 U.S. application No. 08/754,349, filed Nov. 22, 1996.
1151 U.S. application No. 08/854,194, filed May 9, 1997.
1162 U.S. application No. 08/921,876, filed Sep. 2, 1997.
1164 U.S. application No. 09/026,872, filed Feb. 20, 1998.
1165 U.S. application No. 08/840,317, filed Apr. 16, 1997.
1168 U.S. application No. 09/027,416, filed Feb. 20, 1998.
1171 U.S. application No. 08/922,196, filed Sep. 2, 1997.
1172 U.S. application No. 08/923,762, filed Sep. 2, 1997.
1186 U.S. application No. 09/026,906, filed Feb. 20, 1998.
1187 U.S. application No. 09/027,008, filed Feb. 20, 1998.
1188 U.S. application No. 09/027,022, filed Feb. 20, 1998.
1189 U.S. application No. 09/026,766, filed Feb. 20, 1998.
1224 U.S. application No. 09/058,642, filed Apr. 10, 1998.
Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).
Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).
N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).
Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).
Fukazawa, M., et al., "Intelligent Network Call Model for Broadband ISDN," Fujitsu Laboratories, Ltd. (Japan), p. 30.6.1–30.6.5.
Minzer, Steven, "A Signaling Protocol for Complex Multimedia Services," IEEE Journal on Selected Areas in Communications (ISSN 0733–8716), vol. 9 (No. 9), p. 1383–1394, (Dec. 1991).
Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).
Miller, P., "Intelligent Network/2: A flexible framework for exchange services," Bell Communications Research Exchange, vol. 3 (No. 3), (May/Jun. 1987).
Cooper, C., et al., "Toward a Broadband Congestion Control Strategy," IEEE Network, The Magazine of Computer Communications, (May 1990).
Batten, A., "Personal Communications Services and the Intelligent Network," British Telecommunications Engineering, (Aug. 1990).
Fujioka, M., et al., "Universal Service Creation and Provision Environment for Intelligent Network," IEEE Communications Magazine, (Jan. 1991).
Andrews, F., "Switching in a Competitive Market," IEEE Communications Magazine, (Jan. 1991).
N/A, "Network Signaling," Telephony, TCX12004, University of Excellence, p. 5.8–5.17, (Oct. 21, 1991).
Garrahan, J.J., et al., "Intelligent Network Overview," IEEE Communications Magazine, p. 30–36, (Mar. 1993).
Johnson, M.A., et al., "New Service Testing Functions for Advanced Intelligent Networks," IEEE 1992 Network Operations and Management Symposium, p. 709–720, (Apr. 6, 1992).
Yeh, S.Y., et al., "The Evolving Intelligent Network Architecture," IEEE Conference on Computer and Communication Systems, p. 835–839, (1990).
Atoui, M., "Virtual Private Network Call Processing in the Intelligent Network," International Conference on Communications, p. 561–565, (1992).
Bosco, P., et al., "A Laboratory for AIN Service Design and Validation," International Conference on Communications, p. 566–571, (Jun. 14, 1992).
Homa, J., et al., "Intelligent Network Requirements for Personal Communications Services," IEEE Communications Magazine, p. 70–76, (Feb. 1992).
Russo, E.G., et al., "Intelligent Network Platforms in the U.S.," AT&T Technical Journal, p. 26–43, (1991).
Van Den Broek, W., et al., "Race 2066–Functional models of UMTS and integration into the future networks," Electronics & Communications Engineering Journal, p. 165–172, (Jun. 1993).
Pinkham, G., et al., "The Ericsson Approach to Intelligent Networks," IEEE Global Telecommunications Conference & Exhibition, Session 10, paragraph 4, p. 320–324, (1988).
N/A, "ANSI–TI.111—1992, Signaling System No. 7 (SS7)—Message Transfer Part (MTP)," American National Standard for Telecommunications.
N/A, "ANSI–TI.112—1992, Signaling System No. 7 (SS7)—Signaling Connection Control Part (SCCP)," American National Standard for Telecommunications.
N/A, "ANSI–TI.113—1992, Signaling System No. 7 (SS7)—Integrated Services digital Network (ISDN) User Part," American National Standard for Telecommunications.
N/A, "ANSI–TI.113a—1993, Signaling System No. 7 (SS7)—Integrated Services Digital Network (ISDN) User Part (NxDSO Multi–rate Connection)," American National Standard for Telecommunications.
N/A, "ANSI–T1.113—1995, Signaling System No. 7 (SS7)—Integrated Services Digital Network (ISDN) User Part," American National Standard for Telecommunications.
N/A, "ATM at a Glance," Transmission Technologies Access Guide, p. 40–42, (1993).

Paglialunga, A., "ISCP Baseline Document (Ver 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," Tekelec, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc. / Stevens Institute of Technology / Bell Comm. Research (Bellcore), p. 1–2, 5–6 and 229, (1994).

N/A, "B–IDSN ATM Adaptation Layer (AAL) Specification, Types 1 & 2," ITU Draft Recommendation I.363.1, (Jul 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nvo. 29–Dec. 17, 1993).

N/A, "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Draft Broadband / Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec. 17, 1993).

N/A, "Q.2931 Overview," ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunication Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revision of Recommendation of Q.850," ITU—T SG 11 WP 2, (Dec. 2–15, 1993).

N/A, "Draft Text for Q.2931 (CH. 1, 2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunications Standardization Sector, Study Group 11, (Nov. 29–Dec. 17, 1993).

N/A, "AnnexesB, C, D, F, H and I of Q.2931," ITU—Telecommunication Standardization Sector, Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," ITU—Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29–Dec. 17, 1993).

N/A, "Draft text for Q.2931: Appendix II (Information Items Required for Connection Establishment and Routing in B–ISDN)," ITU—Telecommunication Standardization Sector, Study Group 11.

N/A, "General Recommendations on Telephone Switching and Signalling—Intelligent Network / Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration—ATM Trunking for Narrowband Services," ATM—Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modificaitons for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

BROADBAND TELECOMMUNICATIONS SYSTEM

CROSS-REFERENCE TO RELATED APPLICATION

This application is a continuation-in-part of prior application Ser. No. 08/525,897, entitled "Broadband Telecommunications System", filed Sep. 8, 1995 U.S. Pat. No. 5,991,301, currently pending, and that is a continuation-in-part of prior application Ser. No. 08/238,605, entitled "Method, System, and Apparatus for Telecommunications Control", filed May 5, 1994, now abandoned.

This application is also a continuation-in-part of prior application Ser. No. 08/525,050, "System for Managing Telecommunications", filed Sep. 8, 1995, currently pending, and that is a continuation-in-part of prior application Ser. No. 08/238,605, entitled "Method, System, and Apparatus for Telecommunications Control", filed May 5, 1994, now abandoned.

BACKGROUND

At present, Asynchronous Transfer Mode (ATM) technology is being developed to provide broadband switching capability for telecommunications calls. A call is a request for telecommunications services. Some ATM systems have used ATM cross-connects to provide virtual connections. Cross-connect devices do not have the capacity to process signaling. Signaling refers to messages that are used by telecommunications networks to set-up and tear down calls. Thus, ATM cross-connects cannot make connections on a call by call basis. As a result, connections through cross-connect systems must be pre-provisioned. They provide a relatively rigid switching fabric. Due to this limitation, ATM cross-connect systems have been primarily used to provide dedicated connections, such as permanent virtual circuits (PVCs) and permanent virtual paths (PVPs). But, they do not provide ATM switching on a call by call basis as required to provide switched virtual circuits (SVCs) or switched virtual paths (SVPs). Those skilled in the art are well aware of the efficiencies created by using SVPs and SVCs as opposed to PVCs and PVPs. SVCs and SVPs utilize bandwidth more efficiently.

ATM switches have also been used to provide PVCs and PVPs. Since PVCs and PVPs are not established on a call-by-call basis, the ATM switch does need to use its call processing or signaling capacity. ATM switches require both signaling capability and call processing capability to provide SVCs and SVPs. In order to achieve virtual connection switching on a call by call basis, ATM switches are being developed that can process calls in response to signaling to provide virtual connections for each call. These systems cause problems because they must be very sophisticated to support current networks. These ATM switches must process high volumes of calls and transition legacy services from existing networks. An example would be an ATM switch that can handle large numbers of POTS, 800, and VPN calls.

Currently, ATM multiplexers are capable of interworking traffic of other formats into the ATM format. These are known as ATM interworking multiplexers. ATM multiplexers are being developed that can interwork traffic into ATM cells and multiplex the cells for transport over an ATM network. One example of an application of these muxes is provided by T1 transport over an ATM connection. Traffic that leaves the switch in T1 format is muxed into ATM cells for transport over a high speed connection. Before the cells reach another switch, they are converted back into the T1 format. Thus, the ATM mux is used for high speed transport. The ATM mux is not used to select virtual connections on a call-by-call basis. Unfortunately, there is not a telecommunications system that can provide ATM switching on a call by call basis without relying on the call processing and signaling capability of an ATM switch.

One solution to the above-described problems is disclosed in the parent applications cross-referenced above. This application disclosed the call by call control of the interworking point. The present invention provides enhancements and improvements to those systems.

SUMMARY

The invention includes a method of operating a telecommunications system to provide a call with a virtual connection. The invention is applicable where a user places the call by sending signaling for the call to the telecommunications system and by transmitting user information to the telecommunications system over a particular connection for the call. The telecommunications system comprises an ATM interworking multiplexer and a signaling processor coupled to the ATM interworking multiplexer. The method comprises receiving the signaling for the call into the signaling processor and processing the signaling to select the virtual connection. The method further includes generating a control message in the signaling processor to identify the particular connection and the selected virtual connection, and transmitting the control message to the ATM interworking multiplexer. The method further includes receiving the user information for the call from the particular connection into the ATM interworking multiplexer and converting the user information into ATM cells that identify the selected virtual connection in response to the control message. The method further includes transmitting the ATM cells from the ATM interworking multiplexer over the selected virtual connection.

The invention also includes a telecommunications system to provide a call received over a particular connection with a virtual connection in response to signaling for the call. The telecommunications system comprises a signaling processor operable to receive and process the signaling to select the virtual connection for the call, and to generate and transmit a control messages that identifies the particular connection and the selected virtual connection. The system further includes an ATM interworking multiplexer operable to receive user information from the particular connection, convert the user information into ATM cells that identify the selected virtual connection in response to the new signaling, and to transmit the ATM cells from the ATM interworking multiplexer over the selected virtual connection. The invention further includes a means for coupling the signaling processor and the ATM interworking multiplexer that is operable to transfer the control message from the signaling processor to the ATM interworking multiplexer. In some embodiments the system also includes an ATM cross-connect system connected to the ATM interworking multiplexer and configured to provide a plurality of virtual connections to the ATM interworking multiplexer.

In various embodiments, the invention accepts calls placed over DS0 voice connections and provides virtual connections for the calls. In this way, broadband virtual connections can be provided to narrowband traffic on a call-by-call basis without requiring the call processing and signaling capability of an ATM switch.

DETAILED DESCRIPTION

For purposes of clarity, the term "connection" will be used to refer to the transmission media used to carry user traffic. The term "link" will be used to refer to the transmission media used to carry signaling or control messages. On the Figures, connections are shown by a single line and signaling links and data links are shown by double lines.

Figure 1:
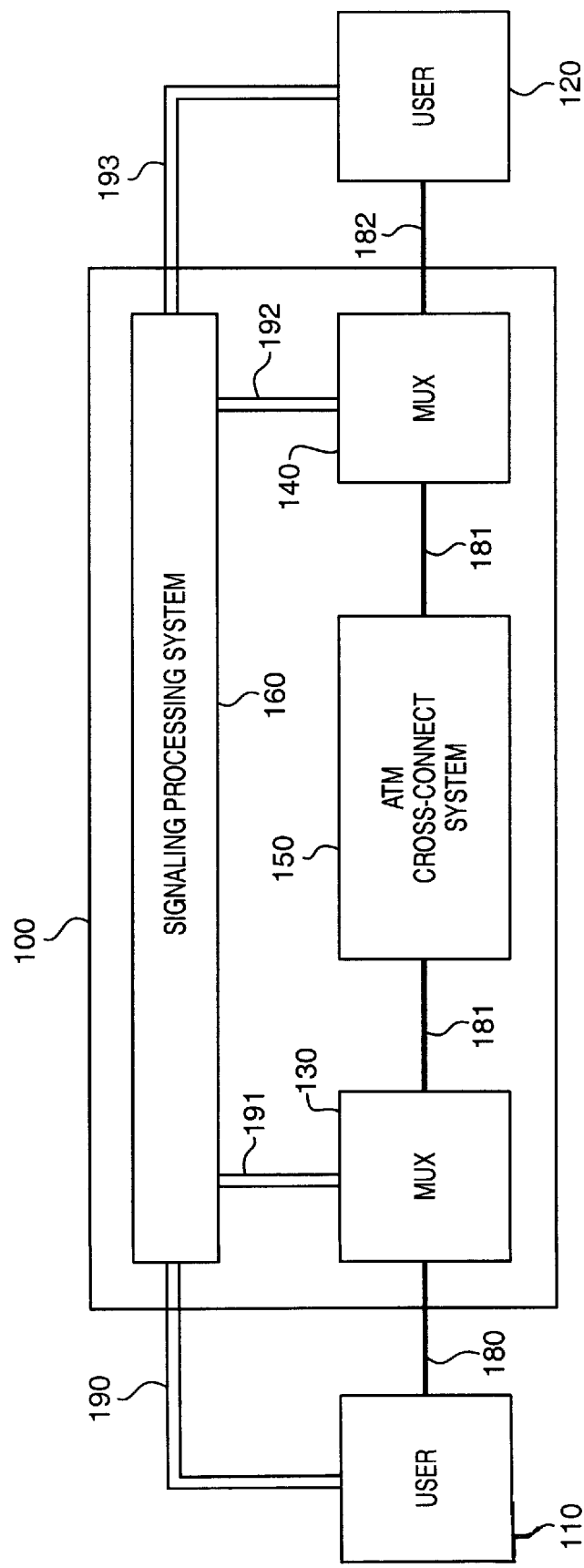
FIG. 1 is a block diagram of a version of the present invention.

FIG. 1 depicts a version of the present invention. Shown is telecommunications system 100, user 110, and user 120. Telecommunications system 100 includes ATM interworking multiplexer (mux) 130, mux 140, ATM cross-connect system 150, and signaling processing system 160. User 110 is connected to mux 130 by connection 180. Mux 130 and mux 140 are connected through cross-connect system 150 by connection 181. Mux 140 is connected to user 120 by connection 182. Signaling processing system 160 is linked to user 110 by link 190, to mux 130 by link 191, to mux 140 by link 192, and to user 120 by link 193.

Those skilled in the art are aware that large networks have many more components than are shown. For example, there would typically be a multitude of virtual connections through ATM cross-connect system 150. The number of these components has been restricted for clarity. The invention is fully applicable to a large network.

User 110 and user 120 could be any entity that supplies telecommunications traffic to network 100. Some examples would be a local exchange carrier (LEC) switch or customer premises equipment (CPE). Connections 180 and 182 represent any connection that might be used by user 120 to access system 100. Typically, the user traffic would be provided to system 100 in DS3, format with embedded DS0 circuits, but could also include formats such as DS1, a fractional DS1, 56 kbit data, DS2, clear DS3, E1, E3, or even an SDH or SONET signal with a DS3 or VT based structure. As such, these connections are periodically referred to as access connections. Links 190 and 193 are any links capable of transferring signaling messages with examples being Signaling System #7 (SS7) links or C7 links. ATM cross-connect system 150 is any system that provides a plurality of virtual connections. Such a system could be comprised of individual ATM cross-connect devices interconnected by ATM connections using DS3 or SONET for transport. An example of an ATM cross-connect is the NEC Model 10. Connection 181 could be any virtual connection. In ATM, virtual connections can be designated by a Virtual Path Identification and/or and Virtual Channel Identification in the cell header. Ranges of VPI/VCI may be used to designate the virtual connection. Typically, the virtual connection would use DS1, DS3, or SONET for transport. ATM cross-connect system 150 would be pre-provisioned to provide a plurality of virtual connections through the cross-connect system, and virtual connection 181 represents one of these connections. As virtual connections are logical paths, many physical paths can be used based on the pre-provisioning of ATM cross-connect system 150. Links 191 and 192 could be any links capable of transporting control messages. Examples of such links could be SS7 links, UDP/IP over an ethernet connection, or a bus arrangement using a conventional bus protocol. The components described in this paragraph are known in the art.

Signaling processing system 160 is any processing platform that can receive and process signaling to select virtual connections, and then generate and transmit messages to identify the selections. Various forms of signaling are contemplated by the invention, including SS7, C7, and user to network interface (UNI) signaling. A preferred embodiment of the signaling processor is discussed in detail toward the end of the disclosure.

Mux 130 could be any muxing system operable to place user information arriving over connection 180 on the virtual connection selected by signaling processing system 160. Typically, this involves receiving control messages from signaling processing system 160 that identify assignments of virtual connections to access connections on a call by call basis. The mux would convert user traffic from access connection 180 into ATM cells that identify the selected virtual connection. Mux 140 is similar to mux 130. A preferred embodiment of these muxes are also discussed in detail below.

The system would operate as follows for a call from user 110 to user 120. User 110 would seize a connection to system 100. The connection is represented by connection 180 to mux 130. Although, only one connection is shown for purposes of clarity, numerous connections would typically be available for seizure. User 110 would also send a signaling message over link 190 to system 100 initiating the call. This signaling would identify seized connection 180. Signaling processing system 160 would process the message. Such processing could include validation, screening, translating, route selection, echo control, network management, signaling, and billing. In particular, a virtual connection through ATM cross-connect system 150 from mux 130 to mux 140 would be selected, and a connection from mux 140 to user 120 would also be selected. Although many possible connections would be available, only the selected connections are shown—connection 181 and connection 182. Generally, the selection is based on the dialed number, but call processing can entail many other factors with a few examples being the caller's number, destination conditions, network loads and user routing instructions. Also, the dialed number may be translated to make the selection. Signaling processing system 160 would send a control message over link 191 to mux 130 that identifies seized connection 180 and selected connection 181. Signaling processing system 160 would send a control message over link 192 to mux 140 that identifies selected connections 181 and 182.

If required, user 120 would receive signaling to facilitate completion of the call. The signaling from signaling processing system 160 would indicate that system 100 was connecting to user 120 over connection 182. Typically, user 120 would accept and acknowledge the connection in a signaling message back to system 100.

In the above procedure, mux 130 would receive control messages from signaling processing system 160 identifying connection 180 as the access connection and connection 181 as the selected virtual connection through ATM cross-connect system 150. Mux 130 would convert the user information from connection 180 into ATM cells. Mux 130 would designate connection 181 in the cell headers. Connection 181 would have been previously provisioned through ATM cross-connect system 150 from mux 130 to mux 140.

Mux 140 would receive control messages from signaling processing system 160 identifying connection 181 as the selected virtual connection and connection 182 as the selected access connection to user 120. Mux 140 would convert cells arriving on connection 181 to user information suitable for connection 182 to user 120. Although the above example employs two muxes, a single mux could be employed for calls that enter and exit system 100 through the same mux. In this case, the ATM system would simply provide a virtual connection back to the same mux. In alternative embodiments, the mux could even cross-connect the two access connections in and out of the network. This cross-connection of two access connections in a single mux could use an internal cell bus or be accomplished by cross-connection without using ATM.

From the above discussion, it can be seen that multiple virtual connections can be pre-provisioned through an ATM cross-connect system to interconnect ATM interworking multiplexers. When a user places a call, one of the virtual connections is selected for the call by the signal processing system and identified to the appropriate muxes. The muxes convert the user information into cells that identify the selected connection. As such, user information can be switched through an ATM fabric on a call by call basis. The system does not require the call processing or signaling capabilities of an ATM switch (although an ATM switch could be used to provide the virtual connections without using its call processing and signaling functions). The system can also implement enhanced services such as N00 and virtual private network (VPN).

Figure 2:
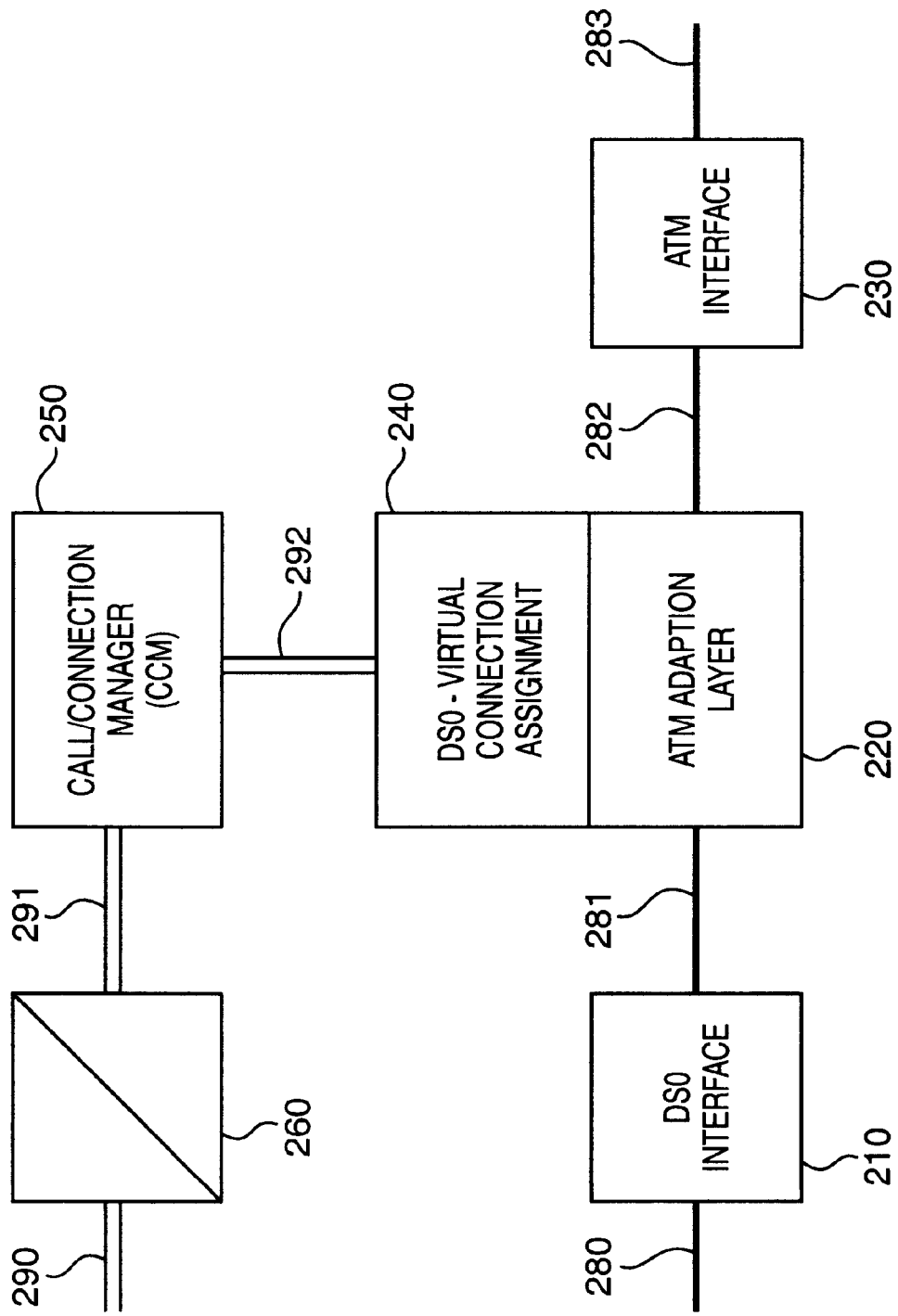
FIG. 2 is a block diagram of a version of the present invention.

FIG. 2 depicts another embodiment of the invention. In this embodiment, the user information from the access connection is capable of being muxed to the DS0 level, but this is not required in other embodiments. Additionally, SS7 signaling is used in this embodiment, but other signaling protocols, such as C7 or UNI signaling, are also applicable to the invention. Shown are DS0 interface 210, ATM adaption layer (AAL) 220, ATM interface 230, DS0—virtual connection assignment 240, call/connection manager (CCM) 250 and signal transfer point (STP) 260. Also shown are connections 280 283 and links 290–292.

Connection 280 could by any connection or group of connections that contain information that can be converted to DS0 format. Examples of these connections are OC-3, VT1.5, DS3, and DS1. DS0 interface 210 is operable to convert user information in these formats into the DS0 format. AAL 220 comprises both a convergence sublayer and a segmentation and reassembly (SAR) layer. AAL 220 is operational to accept the user information in DS0 format from DS0 interface 210 and convert the information into ATM cells. AALs are known in the art and information about AALs is provided by International Telecommunications Union (ITU) document I.363.1. An AAL for voice is also described in patent application Ser. No. 08/395,745, filed on Feb. 28, 1995, entitled "Cell Processing for Voice Transmission", and hereby incorporated by reference into this application. ATM interface 230 is operational to accept ATM cells and transmit them over connection 283. Connection 283 is a standard DS1, DS3 or SONET connection transporting ATM cells. Connection 281 is operational for the DS0 format and connection 282 is operational to transfer ATM cells.

It can be seen that a communications path through connections 280–283 could be established to carry user information. Although the communications path has been described from connection 280 to connection 283, the invention contemplates components that are also operational to perform reciprocal processing in the reverse direction. If the communications path is bi-directional, user information in ATM cells arriving on connection 283 would be processed for output on connection 280 in the appropriate format. Those skilled in the art will appreciate that separate connections could also be setup in each direction, or that only a connection in one direction may be required. These components and their operation are known in the art.

Signaling links 290 and 291 are SS7 links. Link 292 is a data link with an example being an ethernet connection transporting UDP/IP, although a bus arrangement could be used if the CCM and the mux are physically integrated. STP 260 is device that routes signaling messages. STPs are well known in the art. CCM 250 would be identified by its own signaling point code. Point codes designate various points in the network and they are used to route signaling messages to these points. ST 260 would route signaling messages with the point code of CCM 250 to CCM 250. The signaling protocol could be based on narrowband Integrated Services Digital Network (ISDN) User Part (N-ISUP) employing Message Transfer Part (MTP) levels 1–3. In some embodiments, the signaling uses N-ISUP messages transported over broadband connections. This would entail a protocol stack of MTP3—Signaling ATM Adaption Layer (SAAL)—ATM. In other words, N-ISUP messages from MTP3 would be encapsulated into ATM cells for transport.

In some embodiments, STP 260 may also convert point codes between the point code for CCM 250 and other point codes. This is so messages sent to other network elements can be diverted to the CCM, and so that messages sent from the CCM can be masked with a point code that is recognized by other network elements. Although point code conversion is not essential, it facilitates the transition of a network to the system of the invention. The conversion could be implemented through a conversion table located between the discrimination function and the routing function of the MTP level 3 function of STP 260. Mapping would be implemented on a linkset by linkset basis, so affected linksets would flag all incoming messages. Flagged messages would access the conversion table. The conversion table would typically convert the destination point code of the message to that of CCM 250, so that the route function of MTP 3 would forward the message to CCM 250. Point code conversion could be based on many factors with a few examples being the destination point code, the origination point code, the signaling link, the circuit identification code, the message type, and various combinations of these and other factors. For example, any SS7 ISUP messages with particular OPC/DPC combinations could have the DPC converted to the point code of CCM 250. These signaling messages would then be routed to CCM 250 by STP 260. In some scenarios, the origination point code of a message leaving CCM 250 may need to be converted to mask CCM 250 as another point code (i.e. a retired switch). The point code mapping would also have to be implemented within the Signaling Network Management function. In some situations, transfer restricted or transfer prohibited messages will need point code conversion to mask the CCM as the sender. One version of a suitable STP is disclosed in U.S. patent application Ser. No. 08/525,868 entitled "Telecommunications Apparatus, System, and Method with Enhanced Signal Transfer Point", which is hereby incorporated by reference into this application.

CCM 250 is a signaling processor that operates as discussed above. A preferred embodiment of CCM 250 is provided later. In this embodiment CCM 250 would be operable to receive and process SS7 signaling to select connections, and to generate and transmit control messages identifying the selections. Preferably, a single CCM would be associated with a single mux or a group of muxes.

Assignment 240 is a control interface that accepts messages from CCM 250. In particular, assignment 240 receives and identifies DS0/virtual connection assignments in the messages from link 292. These assignments are provided to AAL 220 for implementation. As such, AAL 220 obtains the virtual path identifier (VPI) and virtual channel identifier (VCI) for each call from assignment 240. AAL 220 also obtains the identity of the DS0 for each call (or the DS0s for an N×64 call). AAL 220 then converts user information between the identified DS0 and the identified ATM virtual connection. Acknowledgments that the assignments have been implemented may be sent back to CCM 250 if desired. It should be noted that these assignments are dynamically received and implemented on a call-bycall basis. This is in contrast to conventional interworking muxes that operate using static assignments. The static assignments can be altered through a provisioning process, but provisioning is not dynamically done on a call-by call basis.

In operation, calls are processed as follows. Signaling messages for calls arrive on link 290 and are routed by STP 260 to CCM 250. Access connections are typically seized contemporaneously with the signaling. All of these connections are represented by connection 280. DS0 interface 210 would convert the traffic on connection 280 into the DS0 format and provide the DS0s to AAL 220 over connection 281.

The signaling received by CCM 250 would identify the access connections for the calls (i.e. the particular DS0s on connection 280), and contain call information, such as dialed numbers. CCM 250 would process the signaling and select connections for the calls. Since multiple virtual connections are pre-provisioned from ATM interface 230 to the other destinations in the network, CCM 250 can select a virtual connection to the destination. The selection process can be accomplished through table look-ups. For example, a table could be used to translate a portion of the dialed number into a VPI. The VCI would be selected based on the available VCIs in the selected VPI. The VPI/VCI combination would correspond to a unique virtual connection pre-provisioned from ATM interface 230 to the appropriate network destination. The selections represent the DS0—virtual connection assignments that are provided to assignment 240 over link 292.

Assignment 240 accepts the DS0—virtual connection assignments and provides them to AAL 220. When AAL 220 receives a particular assignment, it places user information bytes from the designated DS0 into cells and appends a header to the cells that identifies the designated VPI/VCI. The cells are provided to ATM interface 230 over connection 282. ATM interface 230 accepts the cells and places them within the transport format for connection 283. The cells are then transported over the selected virtual connection to the appropriate destination.

Calls also exit the network through connection 280. In this case, other CCMs at the origination points select the virtual connections to ATM interface 230. The originating CCMs also send signaling messages to CCM 250. The signaling messages identify the destinations for the calls and the selected virtual connections. CCM 250 will have a list of available access connections to the identified destinations. CCM 250 will select the access connections to the destinations from the list. For example, the connection selected by CCM 250 could be a DS0 embedded within a DS3 connected to a LEC. The virtual connections on connection 283 and selected access connections on connection 280 are provided to assignment 240 over link 292. Assignment 240 provides these assignments to AAL 220.

ATM interface 230 will demux the cells arriving from connection 283 and provide them to AAL 220. AAL 220 converts the user information in the cells into the DS0 format. AAL 220 make the conversion so that cells from a particular virtual connection are provided to the assigned DS0 on connection 281. DS0 interface will convert the DS0s from connection 281 into the appropriate format, such as DS3, for connection 280. Those skilled in the art are aware of the techniques for muxing and transporting DS0 signals.

From the above discussion, it can be seen that user information for calls can flow from connection 280 to connection 283, and in the reverse direction from connection 283 to connection 280. DS0 interface 210 and ATM interface 230 provide user information in their respective formats to AAL 220. AAL 220 converts the user information between DS0 and ATM formats based on the assignments from assignment 240. CCM 250 can select the DS0—virtual connection assignments that drive the process.

The ATM Interworking Multiplexer

Figure 3:
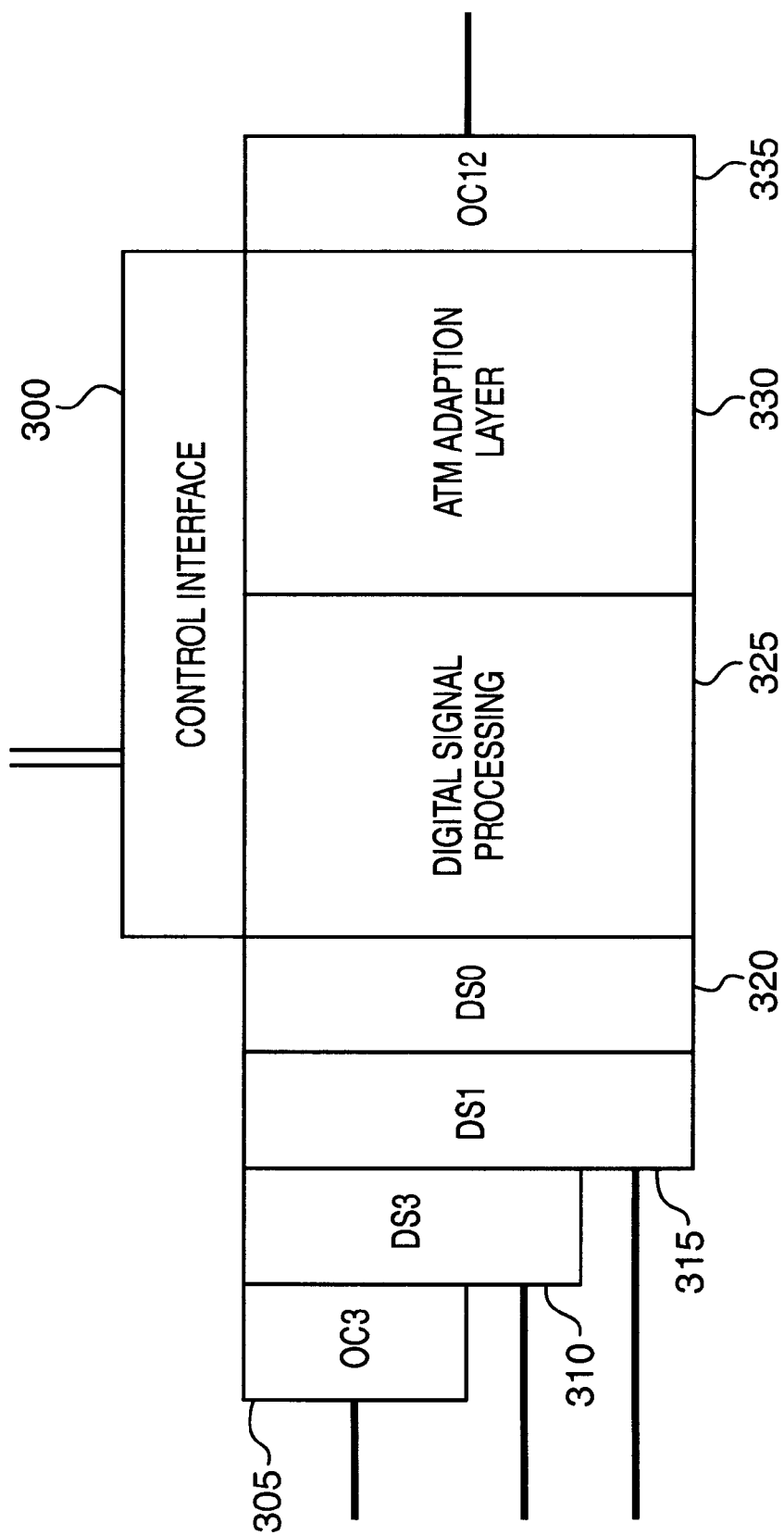
FIG. 3 is a block diagram of a version of the present invention.

FIG. 3 shows one embodiment of the mux that is suitable for the present invention, but other muxes that support the requirements of the invention are also applicable. Shown are control interface 300, OC-3 interface 305, DS3 interface 310, DS1 interface 315, DS0 interface 320, digital signal processing (DSP) 325, AAL 330, and OC-12 interface 335.

OC-3 interface 305 accepts the OC-3 format and makes the conversion to DS3. DS3 interface 310 accepts the DS3 format and makes the conversion to DS1. DS3 interface 310 can accept DS3s from OC-3 interface 305 or from an external connection. DS1 interface 315 accepts the DS1 format and makes the conversion to DS0. DS1 interface 315 can accept DS1s from DS3 interface 310 or from an external connection. DS0 interface 320 accepts the DS0 format and provides an interface to digital signal processing (DSP) 325.

DS0 interface 320 is coupled to DSP 325. DSP 325 is capable of manipulating the user information to improve transmission quality. DSP processing primarily entails echo cancellation, but could include other features as well. As is known, echo cancellation can be required for voice calls. DSP 325 passes the DS0s through echo cancellers. These echo cancellers must be disabled for calls that do not require echo control. Data calls do not require echo cancellation, and the CCM has the ability to recognize data calls that require an echo canceller to be disabled. The CCM will send a control message to DSP 325 indicating the particular echo canceller that is to be disabled. The CCM selects the echo canceller based on the Circuit Identification Code (CIC) in the signaling it receives from the user. After the data call, the CCM sends a message that causes the particular echo canceller to be enabled again for subsequent voice calls. The above technique of applying echo control is preferred, but other means of implementing echo control instructions from the CCM are also applicable.

In addition to echo control, the CCM and the mux can work to provide other digital signal processing features on a call by call basis. Compression algorithms can be applied, either universally, or on a per call basis. The decibel level could be adjusted for calls form a particular origin or to a particular destination, i.e. where a hearing impaired person may reside. Encryption could be applied on a call-by-call basis based on various criteria like the origination number or the destination number. Stored messages could be plated on the line, DTMF tones could be detected and transmitted on the line. DTMF information might be exchanged with the CCM, or another service platform. Various DSP features could be associated with various call parameters and implemented by the CCM through DSP 325.

DSP 325 is connected to AAL 330. AAL 330 operates as described above for an AAL. DS0—virtual connection assignments from control interface 300 are implemented by AAL 330 when converting between the DS0 and ATM formats. Calls with a bit rate greater than 64 kbit/sec. are known as N×64 calls. If desired, AAL 330 can be capable of accepting control messages through control interface 300 from the CCM for N×64 calls. The CCM would instruct AAL 330 to group the DS0s for the call.

The ATM Cross-Connect System

Figure 4:
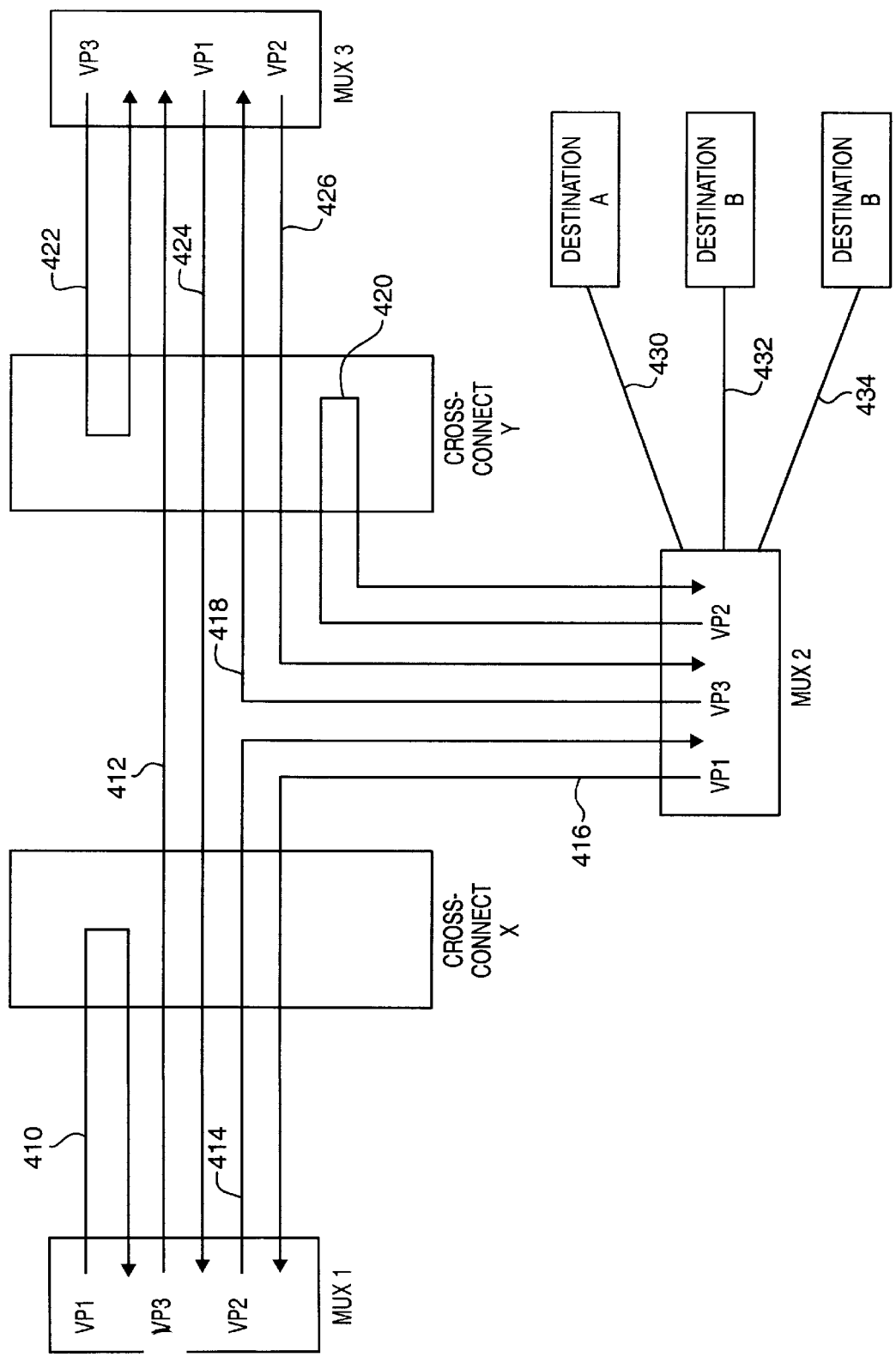
FIG. 4 is a logic diagram of a version of the present invention.

FIG. 4 depicts virtual connections provided by the ATM cross-connect system in a version of the invention, although numerous other techniques for providing virtual connections will be appreciated by one skilled in the art, and the invention contemplates any such system. Shown are virtual connections 410, 412, 414, 416, 418, 420, 422, 424, and 426. These virtual connections are shown interconnecting muxes 1, 2, and 3 through cross-connects X and Y. Virtual connections are provisioned in between each mux. Each mux would have a virtual path provisioned through the cross-connect system to every mux. Additional virtual paths could be provisioned between two muxes using diverse physical routes for the sake of redundancy. These virtual paths are designated in the ATM cells by the VPI. The VPIs are designated locally by the cross-connects to be the destination mux. For example, connections 410, 416, and 424 are all designated as VP1 because they terminate at mux 1. Connections that terminate at mux 2 can be defined locally as VP2. On a call entering at mux 1, the NPA-NXX of the dialed number might be analyzed to select mux 2 as the terminating mux. As such the VPI used on the call would be VP2. From mux 1, VP2 connects to mux 2. The VCIs in VP2 would also be tracked and an available one would be selected. As an alternative to VPI provisioning between muxes, ranges of VCIs may be provisioned between muxes to add granularity below the VPI level.

Additional granularity is required to specify the destination beyond the mux. For example, a mux might be connected to several different destination over several different DS3 trunks. This is illustrated by connections 430, 432, and 434 between mux 2 and destinations A, B, and C respectively. On a call through mux 2, it could be desirable to specify the destination for the call to mux 2 in addition to the VPI/VCI the call will use. This could be done by designating both the VPI/VCI and the destination code in the message from the originating CCM to the terminating CCM. The terminating CCM would then select the DS0 to the destination. This allows the local CCM to select DS0s to a pre-selected destination.

Typically, calls will require a bi-directional voice connection. Conventional voice circuits, such as the DS0, are bi-directional. ATM connections are not typically bi-directional. For this reason, a virtual connection must also be selected to transport user information in the opposite direction—terminating to receiving. This could be done by simply loading all selection tables with the corresponding VPI/VCI to make the connection bi-directional. If only a unidirectional communications path is required, this may be omitted.

Operation within a Network

Figure 5:
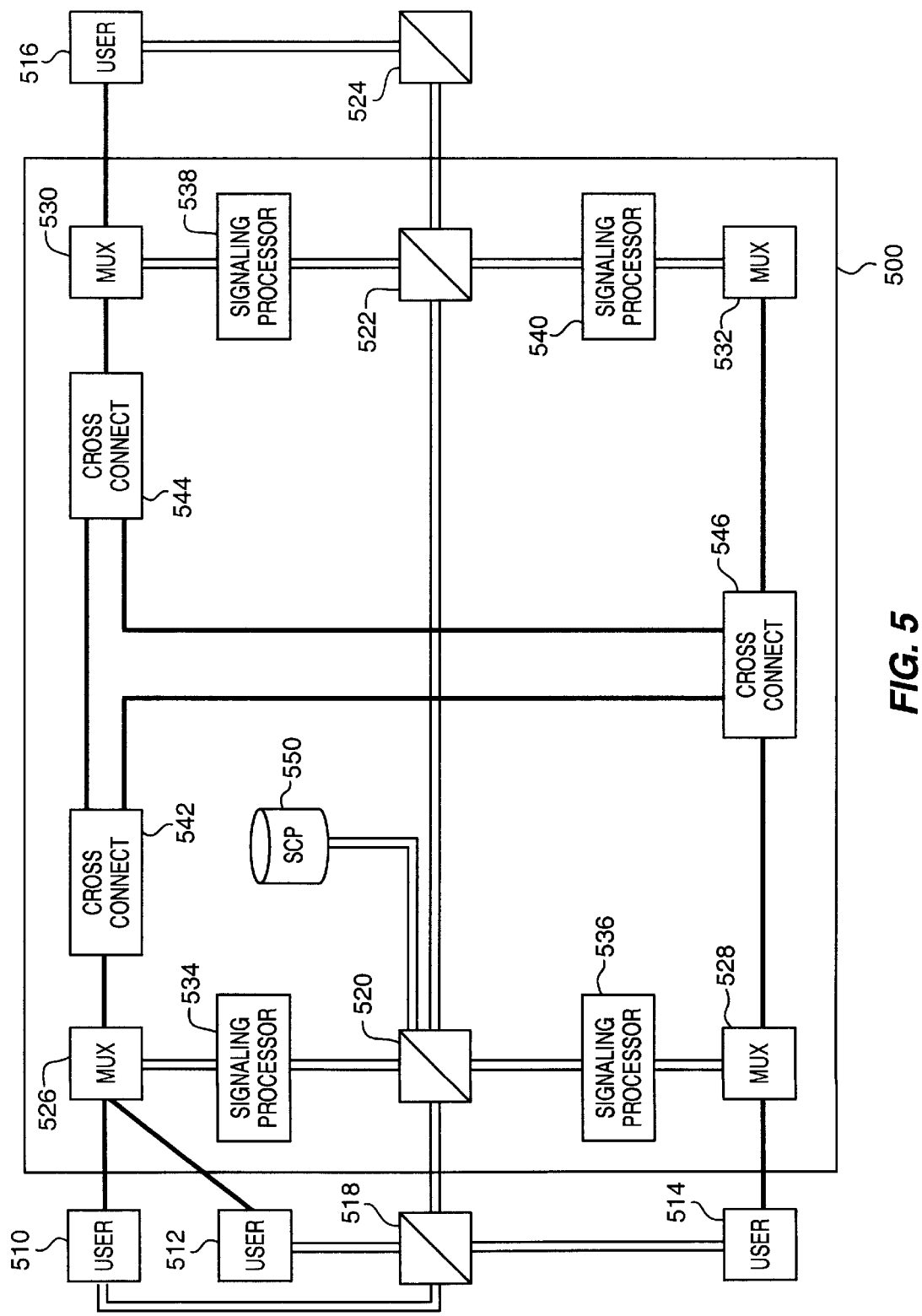
FIG. 5 is a block diagram of a version of the present invention.

FIG. 5 depicts an embodiment of the invention with respect to a specific telecommunications network scenario, although the invention is not limited to this specific scenario. FIG. 5 shows telecommunications system 500. Shown are user 510, user 512, user 514, user 516, STP 518, STP 520, STP 522, STP 524, mux 526, mux 528, mux 530, mux 532, call/connection manager (CCM) 534, CCM 536, CCM 538, CCM 540, ATM cross-connect 542, ATM cross-connect 544, ATM cross-connect 546, and Service Control Point (SCP) 550. The CCMs are designated as "signaling processor" on FIG. 5. For clarity, the connections and signaling links are not numbered. Except for the SCP, all of these components are described above, and the CCMs are also discussed below. SCPs are well known in the art. An SCP is a processor and database that answers signaling queries to assist in call processing. An example is an "800" routing query between a switch and an SCP.

In operation, user 510 may forward an 800 call to system 500. User 510 could be connected to mux 526 with a DS3 connection. The 800 call would occupy a DS0 embedded in the DS3 connected to mux 526. User 510 would send an SS7 Initial Address Message (IAM) through STP 518 to system 500. STP 520 would be configured to route the IAM to CCM 534. An IAM contains information such as the dialed number, the caller's number, and the circuit identification code (CIC). The CIC identifies the DS0 used by user 510 for the call.

CCM 534 would process the IAM and identify that the call was an 800 call. After initial call processing, CCM 534 would query SCP 550 for routing instructions. SCP 550 would translate the dialed number based on the 800 subscriber's routing plan. For example, 800 calls from user 510 may be routed to user 512 during business hours, to user 514 at night, and to user 516 on weekends. If the call is placed from user 512 on a weekend, the call would be routed to user 516. As such, SCP 550 would return the POTS number for user 516 to CCM 534.

CCM 534 would process the POTS number to select: 1) the VPI/VCI for a virtual connection from mux 526 to mux 530, 2) the destination point code (PC) for CCM 538, and 3) the identification of a trunk group from mux 530 to user 516. CCM 534 would generate an IAM message to send to CCM 538 and insert the selected information. Since the two muxes define the VPI between them, the originating point code and the destination point code of the IAM can be used by CCM 538 to identify the selected VPI for the call. The OPC and DPC would be placed in the routing label of the IAM.

The VCI and trunk group ID could be placed in the CIC field of the IAM including the two spare bits. Since 16 bits are available, 256 trunk groups and 256 VCIs are available. These bits should be configured to allocate 256 VCIs to each of the 256 trunk groups that are available for each VPI. The terminating CCM would have to use both the VPI code and the CIC to identify the actual VCI in the cell headers. In other words, between an originating mux and a terminating mux there is one VPI. For that VPI, there are 256 possible trunk groups to connect to on the other side of the mux, and 256 VCIs are allocated for each VPI/trunk group combination. CCM 534 would send the IAM message to CCM 538 through STP 520 and STP 522. If the IAM is N-ISUP, it could be transported conventionally or over ATM connections by using an SAAL and an ATM layer to encapsulate the message. In the alternative to the above scenario, the VPI, VCI, and trunk group could be identified in a private parameter of the IAM, or they could be delivered in a separate message between the CCMs.

CCM 534 has effectively routed the call for CCM 538. If N-ISUP is used for the IAM format, the routing label and the CIC are at a fixed location. Because the VPI/VCI and the trunk group to user 516 are coded into the IAM at a fixed location. CCM 538 does not need to parse the entire IAM or perform detailed call processing. CCM 538 only needs to select an available DS0 in the identified trunk group and to select the DPC for user 516. The service indicator, also at a fixed location of the IAM, could be used to indicate to a terminating CCM that the originating CCM has pre-routed the call, and that call processing need only entail selection of a DS0 and DPC for the identified trunk group. DS0 and DPC selection could be accomplished by a database look-up. Echo control can be handled in a similar manner. CCM 534 handles echo control at the originating side of the call. For echo control at the terminating side, CCM 534 could use the service indicator to indicate that echo control did not need to be handled by CCM 538. This would be the case for a conventional voice call where an echo canceller is already active at the terminating side. Alternatively, CCM 538 could assess echo control using fixed parts of the IAM and still avoid parsing the entire message. In some embodiments, it may be desirable to have CCM 538 process the IAM in a similar fashion as CCM 534.

Typically, mux 530 would be connected to user 516 with a DS3 trunk group. CCM 538 would select a DS0 embedded in the DS3 and would send an IAM to user 516 through STP 522 and STP 524. The CIC of this IAM would indicate that a call was being routed to user 516 over the selected DS0. This CIC would be in conventional 14 bit format with two spare bits. User 516 would process the IAM and complete the call. When the call is answered, user 516 would transmit an answer message (ANM) through STP 524 back to system 500.

CCM 534 would also send a UDP/IP message to mux 526 instructing it to assemble the user information in the DS0 from user 510 into ATM cells with a cell header identifying the selected VPI/VCI. CCM 538 would send a UDP/IP message to mux 530 instructing it to dis-assemble ATM cells from the selected VPI/VCI and output the user information to the selected DS0 to user 516. ATM cross-connect 542 would route ATM cells from mux 526 to ATM cross-connect 544 based on the cell header. Likewise, ATM cross-connect 544 would route these cells to mux 530 based on the cell header. As such, user information for the call would flow from user 510 to user 516 over the DS0 from user 510, the virtual connection selected by CCM 534, and the DS0 to user 516 selected by CCM 538. The muxes would implement the selections of the CCMs.

The call would require that a voice channel be available in both directions. As such, the DS0s and virtual connection would be bidirectional. In the ATM system, this could be accomplished by assigning a reciprocal VPI/VCI in the reverse direction for each VPI/VCI in the forward direction. Cut-through on the receive channel (from the user 516 to the user 510) would occur after the address complete message (ACM) had been received by system 500. Cut-through on the transmit channel (from the user 510 to the user 516) would occur after the answer message (ANM) had been received by system 500. This could be accomplished by not allowing mux 530 to release any cells for the call until the ANM has been received by system 500.

If user 510 were to place the call at night, CCM 534 and SCP 550 would determine that user 514 was the destination. Accordingly, a pre-provisioned virtual connection from mux 526 through ATM cross-connect 542 and ATM cross-connect 546 to mux 528 would be selected by CCM 534 for the call. CCM 536 would select the DS0 to user 514.

If user 510 were to place the call during the day, CCM 534 would determine that user 512 was the destination. Accordingly a pre-provisioned virtual connection from mux 526 through ATM cross-connect 542 and back to mux 526 would be selected for the call. CCM 534 would also select the DS0 to user 512. In some embodiments, the mux could be designed to cross-connect DS0 to DS0 as well as DS0 to VPI/VCI. In this case, mux 526 would make a DS0 to DS0 connection in response to the message from CCM 534 and the ATM system would not be used.

The Call/Connection Manager (CCM)

Figure 6:
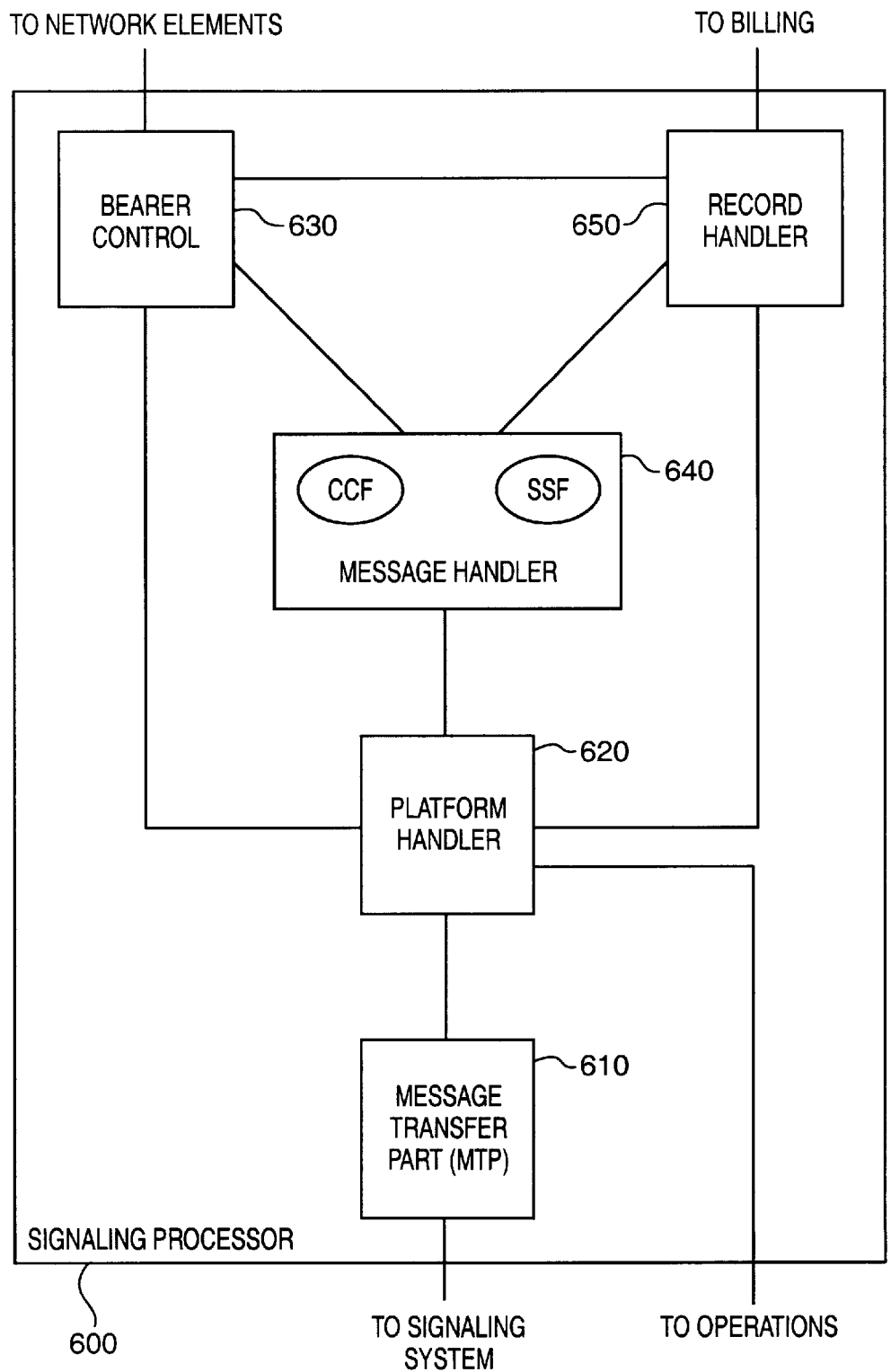
FIG. 6 is a logic diagram of a version of the invention.

FIGS. 6–12 refer to a preferred embodiment of the signaling processor, also known as the CCM, but any processor which supports the requirements stated for the invention would suffice. FIG. 6 depicts a signaling processor suitable for the invention. Signaling processor 600 would typically be separate from the mux, but those skilled in the art appreciate that they could be housed together and coupled in a bus arrangement instead of being coupled by a data or signaling link. Signaling processor 600 may support a single mux or support multiple muxes.

Signaling processor 600 includes Message Transfer Part (MTP) 610. MTP 610 can be comprised of signaling point software that is known in the art. MTP 610 includes various levels known as MTP 1, MTP 2, and MTP 3. MTP 1 defines the physical and electrical requirements for a signaling link. MTP 2 sits on top of MTP 1 and maintains reliable transport over a signaling link by monitoring status and performing error checks. Together, MTP 1–2 provide reliable transport over an individual link. A device would need MTP 1–2 functionality for each link it uses. MTP 3 sits on top of MTP 2 and provides a routing and management function for the signaling system at large. MTP 3 directs messages to the proper signaling link (actually to the MTP 2 for that link). MTP 3 directs messages to applications using MTP 610 for access to the signaling system. MTP 3 also has a management function which monitors the status of the signaling system and can take appropriate measures to restore service through the system. MTP levels 1–3 correspond to layers 1–3 of the open systems interconnection basic reference model (OSIBRF). MTP 610 could also include Signaling Connection Control Part (SCCP) functions, as well as, TCAP, and ISUP functional interfaces. In addition, MTP 610 may be equipped with ISUP timers that generate release messages or retransmit messages where appropriate. If B-ISUP signaling is being used, MTP 610 could also be equipped with BISUP capability. All of these elements are known in the art.

Also shown for signaling processor 600 are platform handler 620, bearer control 630, message handler 640, and record handler 650. MTP 610 could be connected to platform handler 620 by an ethernet interface supporting TCP/IP which transfers signaling messages from MTP 610 to platform handler 620. Those skilled in the art will recognize other interfaces and protocols which could support these functions in accord with the invention.

Platform handler 620 is a system which accepts ISUP messages from MTP 610 and routes them to message handler 640. Message handler 640 is a system which exchanges signaling with platform handler 620 and controls the connection and switching requirements for the calls. Bearer control 630 handles bearer capabilities for the call. Record Handler 650 generates call records for back-office systems.

In operation, ISUP messages are routed by MTP 610 to platform handler 620. Platform handler 620 would route the ISUP messages to message handler 640. Message handler 640 would process the ISUP information. This might include validation, screening, and retrieving additional data for call processing. Bearer control 630 would implement the bearer capabilities required, such as echo cancellation, through control messages to the appropriate network elements. Message handler 640 would complete call processing. Message handler 640 would generate the appropriate messages to implement the call and pass the messages to platform handler 620 for subsequent transmission to the designated network elements. Message handler 640 would also receive ISUP messages from MTP 610 at the completion of the call. Message handler 640 would process these messages and generate subsequent messages to tear down the call. Record handler 650 would obtain call information from message handler 640 and use this information to generate call records. The call records could be used for billing purposes.

Functional entities are well known in the art. Message handler 640 includes at least the call control function (CCF) and the service switching function (SSF). The CCF establishes and releases call connections, and the SSF recognizes triggers during call processing by the CCF and provides an interface between the CCF and the service control function (SCF). The SCF identifies services and obtains data for the service, and is preferably housed in a remote database, such as an SCP. (As such, the SCF is not shown on FIG. 6.) Message handler 640 is able to control connections, recognize triggers, and access the SCF in a remote database.

Signaling processor 600 is comprised of hardware and software. Those skilled in the art are aware of various hardware components which can support the requirements of the invention. One example of a such hardware is the FT-Sparc provided by Integrated Micro Products PLC. The FT-sparc could use the Solaris operating system also provided by Integrated Micro Products PLC. MTP 610 could be constructed using commercially available SS7 software interface tools. An example of such tools would be SS7 interface software provided by either Trillium, Inc. or by Dale, Gesek, McWilliams, and Sheridan, Inc. Any data storage requirements could be met with conventional database software systems.

Software for platform handler 620, bearer control 630, message handler 640, and record handler 650 could be produced in the following manner. The Intelligent Network Conceptual Model (INCM) of the ITU-T Q.1200 series could be mapped to Specification Design Language (SDL) of ITU-T Z.200 and Message Sequence Charts (MSC) of ITU-T Z.120. Various detection points and points-in-call in the INCM can be skipped to optimize call processing. The SDL could then be compiled into C or C++ and loaded onto the FT-sparc. The software is primarily comprised of several static processes, instantiated processes (from static processes), and communication channels between the processes. Preferably, the software processes would be partitioned into several operating system tasks. Further requirements for the software design will become apparent in the following discussion.

The Platform Handler

Platform handler 620 is preferred, but is not required as its functions could be handled by MTP 610 and/or message handler 640. Platform handler 620 has massaging interfaces that exchange, buffer, dis-assemble, and re-assemble messages for MTP 610, bearer control 630, message handler 640, and record handler 650. Platform handler 620 could exchange these messages over an ethernet—TCP/IP interface, but any technique for transfer of messages is contemplated by the invention. Platform handler 620 could also check the messages for basic flaws. Should more than one message handler be connected to platform handler 620, ISUP messages could be allocated to the message handlers based on the SLS of the particular ISUP message. Platform handler 620 also accepts routing instructions from message handler 640 for routing certain ISUP messages to particular select call model processes of message handler 640.

Platform handler 620 is also responsible for managing and monitoring CCM activities. Among these are CCM start-up and shut-down, log-in and log-off of various CCM modules, handling administrative messages (i.e. error, warning, status, etc.) from the CCM modules, and handling messages from network operations such as queries, configuration instructions, and data updates. The connections to the various CCM modules are shown. The connection to network operations is the man machine interface which allows the CCM to be controlled and monitored by either a remote or a local operator. Platform handler 620 has a process which retrieves configuration data from internal tables to initialize and configure the CCM. The CCM modules also have internal tables which are used in conjunction with this procedure.

The Message Handler

Figure 7:
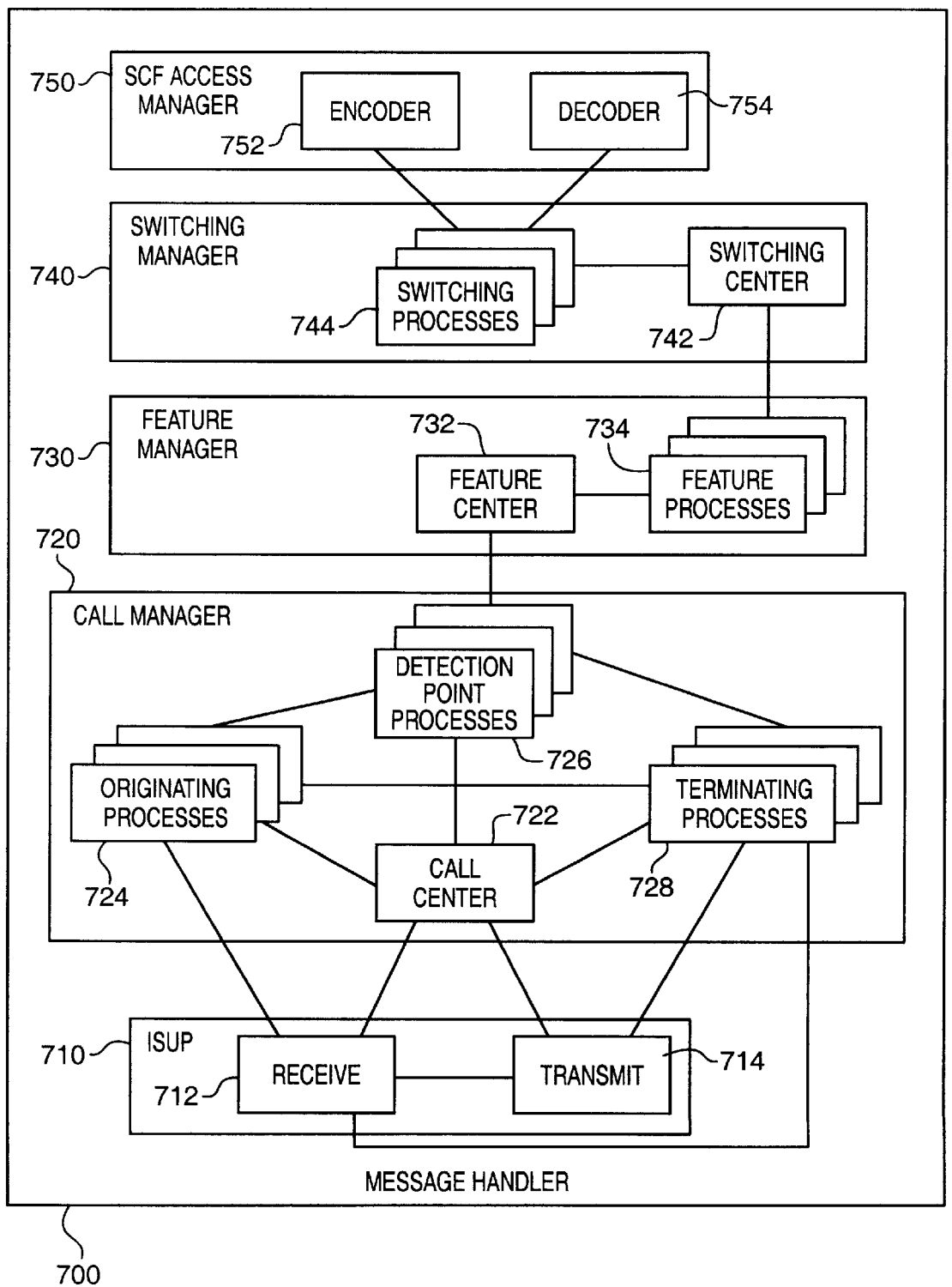
FIG. 7 is a logic diagram of a version of the invention.

FIG. 7 depicts a version of the message handler. External connections have been omitted for the sake of clarity. Message handler 700 is shown and includes ISUP 710, call manager 720, feature manager 730, switching manager 740, and SCF access manager 750. The primary function of message handler 700 is to process ISUP messages for calls, generate subsequent messages, and invoke services. As a result of its processing, message handler 700 is able to assign incoming access connections (CICs in SS7) to VPI/VCIs and instruct the mux to provide SVPs and SVCs through an ATM cross-connect system.

ISUP 710 receives generic ISUP messages from the platform handler and converts them into specially formatted ISUP messages using receive 712. ISUP 710 reverses this process in transmit 714 for messages sent to the platform handler. Receive 712 forwards formatted messages to call manager 720. ISUP 710 also exchanges local management message with the platform handler.

Call manager 720 could include the functionality specified in the Intelligent Network Call Model (INCM) of ITU-T Q.1214 which encompasses the main functionality of the CCF. Call center 722 receives IAM messages and creates an originating call model process for each IAM. Each originating process is parameterized with data from its particular IAM. Additional origination processes can be created based on the IAM if it is a multi-party call. All of these originating processes are represented by originating processes 724.

An originating process will typically create a detection point process. All of the detection point processes created are represented by detection point processes 726. Each originating process will also set-up a call control block containing data for the call. Each origination process will execute through a point-in call to a detection point. When detection points are encountered, and the originating process has not been programmed to skip them, a signal representing the detection point is forwarded to the corresponding detection point process. As stated above, call processing can be streamlined by skipping selected detection points and points-in-call. When an originating process sends a detection point signal to the corresponding detection point process, processing is suspended at the originating process until a response is received from the detection point process.

Detection point processes 726 provides a portion of the SSF and acts as a buffer between the call processes and feature manager 730. A detection point process analyzes the detection point signal from the origination process to determine if is should be acted on or if it can be ignored. If the processing results in a service request or notification, a corresponding signal is sent to feature manager 730. Detection point responses from feature manager 730 are forwarded back to the appropriate call process. Once call set-up has been authorized for the originating process, a detection point process will also send a signal to call center 722 to create a terminating process.

These terminating processes are represented by terminating processes 728. A terminating process creates and interacts with detection point processes 726 much like an originating process. A terminating process also creates a terminating call control block. ISUP information is transferred from the originating process for a call to the terminating process for the call. The platform handler is instructed of the originating and terminating processes so that subsequent ISUP messages related to that call can be transferred directly to the appropriate processes by the platform handler. Both originating and terminating processes have a local database. For example, a termination process might access local data to translate the NPA-NXX of a dialed number into the VPI to a destination mux.

The originating processes and terminating processes also exchange messages with bearer control. Typically, these messages relate to echo canceller and mux control. For calls that pass through two muxes (an originating mux into the ATM network and a terminating mux out of the ATM network), both an origination and termination process is required for each mux—a total of four call processes. The originating process for the originating mux will handle echo cancellation for the origination side of the call. The termination process for the origination mux will handle mapping the incoming DS0 to the VPI/VCI. The termination process for the terminating mux will map the VPI/VCI to an outgoing DS0 and handle echo cancellation for the terminating side of the call. If only one mux is used on the call (in and out of the network at the same mux), only a single origination process and a single termination process is required.

The originating processes and terminating processes also exchange messages with the record handler. Typically, these messages relate to billing and operational measurements. Upon call tear down, the record handler receives the originating and terminating call control blocks for billing purposes. These call control blocks typically would identify the following: the call control block ID, the originating/terminating process ID, the message handler, the originating LEC, the LEC trunk circuit (CIC), the ATM virtual circuit, the ATM virtual path, the caller's number, the dialed number, the translated dialed number, the originating line information, the ANI service class, the selected route, the number of the selected route, the SLS, the OPC, the DPC, the service indicator (SIO), echo cancellation status, reason of release, call status, and pointers to adjacent call control blocks. In addition, the call control block would also contain the various times that signaling messages are received, such the address complete message (ACM), the answer message (ANM) the suspend message (SUS), the resume message (RES), and the release message (REL). Those skilled in the art would be aware of other pertinent data to include.

Call manager 720 communicates with feature manager 730. Feature manager 730 handles interaction of services for the call. Examples of services would be 800 calls, PCS calls, and VPN calls, but there are many others. Feature manager 730 is comprised of feature center 732 and feature processes 734. Feature center 732 receives the detection point messages from the detection point processes 726. Feature center 732 then creates a feature process for each call. These processes are represented by feature processes 734. The feature process will determine if additional data is needed for the detection point. If so, a signal is sent to switching manager 740. Responses from switching manager 740 are sent to the appropriate detection point process by the feature process for the call.

In this embodiment, the feature process sends all such service signals to switching manager 740. In other embodiments, services may be segregated into "IN" and "non-IN" services, the feature process would then have to select between an "IN" switching manager or a "non-IN" switching manager when sending service signals to switching manager 740.

Switching manager 740 is comprised of switching center 742 and switching processes 744. Switching manager creates a switching process for each service required on the call. These switching processes are represented by switching processes 744. A switching process will communicate directly with the associated feature process for the call. The switching process will also interface with the SCF. As stated above, the SCF provides the service processing for the call and is preferably located at a remote database. A typical example of accessing SCF would be to send a TCAP query to a service Control Point (SCP) for an "800" number translation. In order to access the SCF, the switching process will use SCF access manager 750. SCF access manager 750 is comprised of encoder 752 and decoder 754. Encoder 752 converts signals from switching processes 744 into the proper format for SCF access. Decoder 754 converts messages from the SCF back into the format for switching processes 744. SCF access manager 750 would typically access the SCF over standard communications links. One example would be an SS7 link using the TCAP/INAP/ASN.1 protocol specified by the ITU. If SS7 is used, SCF access manager 750 could forward its TCAP messages to the MTP function (MTP 610 of FIG. 6) for subsequent transfer to an STP and SCP.

From the above discussion, it should be clear that message handler 700 is comprised of static processes identified as "centers" that create specific processes for each call. Once created, these specific call processes communicate directly with one another to accomplish call processing.

Bearer Control and the Record Handler

The following discussion refers to both FIGS. 6 and 7. Depending on which call segment (originating or terminating) is being processed, the origination process or the termination process will check the user service information data and originating line information to assess the need for echo control. If the call is a data call, a message is sent to bearer control 630. Based on the CIC, bearer control 630 can select which echo canceller circuit needs to be disabled. A message will be generated to that effect and transmitted over a standard data link, such as UDP/IP, to the pertinent echo control system. If the echo canceller is remote, a T1 link may be desired for transport. As described above, echo control can be implemented by the multiplexer. Once a release (REL) message is received for the call, the echo canceller is re-enabled. On a typical call, this procedure will occur twice. Once for an echo canceller on the originating side of the call, and again for an echo canceller on the terminating side of the call. The CCM that handles the IAM for a particular call segment will control the particular echo cancellers for the segment. An example of an echo control system would be a Tellabs echo canceller controller with ethernet interfaces connected over an asynchronous bus to the echo cancellers. The echo cancellers could be integrated into the muxes.

After a release message on a call, the originating and terminating processes will forward the information in the call control block to record handler 650. Record handler 650 will use the call control block to create a billing record. The call control block would contain information from the ISUP messages for the call and from CCM processing. From the address complete message (ACM), the call control block would include the routing label, CIC, message type, and cause indicators. From the answer message (ANM), the call control block would include the routing label, CIC, message type, and backward call indicators. From the initial address message (IAM), the call control block would include the routing label, CIC, message type, forward call indicators, user service information, called party number, calling party number, carrier identification, carrier selection information, charge number, generic address, origination line information, original called number, and redirecting number. From the release message (REL), the call control block would include the routing label, CIC, message type, and cause indicators. From the suspend message (SUS) or the pass along message (PAM), the call control block would include the routing label, CIC, and message type. Those skilled in the art are familiar with other pertinent information for a billing record and appreciate that some of this information could be deleted. The billing record will be forwarded by record handler 650 to a billing system over a billing interface. An example of such an interface is an ethernet—FTAM protocol.

Call Processing

SS7 massaging is well known in the art. SS7 ISUP messages contain numerous fields of information. Each message will have a routing label containing a destination point code (DPC), an origination point code (OPC), and a signaling link selection (SLS) which are used primarily for routing the message. Each message contains a circuit identification code (CIC) which identifies the circuit to which the message relates. Each message contains the message type which is used to recognize the message. ISUP messages also contain mandatory parts filled with fixed length data and variable length data, in addition to a part available for optional data. These parts vary from message type to message type depending on the information needed.

The initial address message (IAM) initiates the call and contains call set-up information, such as the dialed number. IAMs are transferred in the calling direction to set up the call. During this process, TCAP messages may be sent to access remote data and processing. When the IAMs have reached the final network element, an address complete message (ACM) is sent in the backward direction to indicate that the required information is available and the called party can be alerted. If the called party answers, an answer message (ANM) is sent in the backward direction indicating that the call/connection will be used. If the calling party hangs up, a release message (REL) is sent to indicate the connection is not being used and can be torn down. If the called party hangs up, a suspend message (SUS) is sent and if the called party reconnects, a resume (RES) message keeps the line open, but if their is no re-connection, a release message (REL) is sent. When the connections are free, release complete messages (RLC) are sent to indicate that the connection can be re-used for another call. Those skilled in the art are aware of other ISUP messages, however, these are the primary ones to be considered.

In the preferred embodiment, call processing deviates from the basic call model recommended by the ITU, although strict adherence to the model could be achieved in other embodiments. FIGS. 8–16 depict message sequence charts for the call processing in one embodiment. Message sequence charts are known in the art, and are a recognized format to depict call processing. At the top of the chart, the basic elements of the CCM are shown—the platform handler, the message handler, the bearer control, and the record handler. The blocks below the message handler indicate the processes for the message handler. Further specification at the process level for the platform handler, the bearer control, and the record handler is not required for this discussion. The charts are read down in a chronological sequence. Blocks indicate tasks performed by the process named above. Arrows indicate messages exchanged between the processes or the creation of a new process by an existing process.

Figure 8:
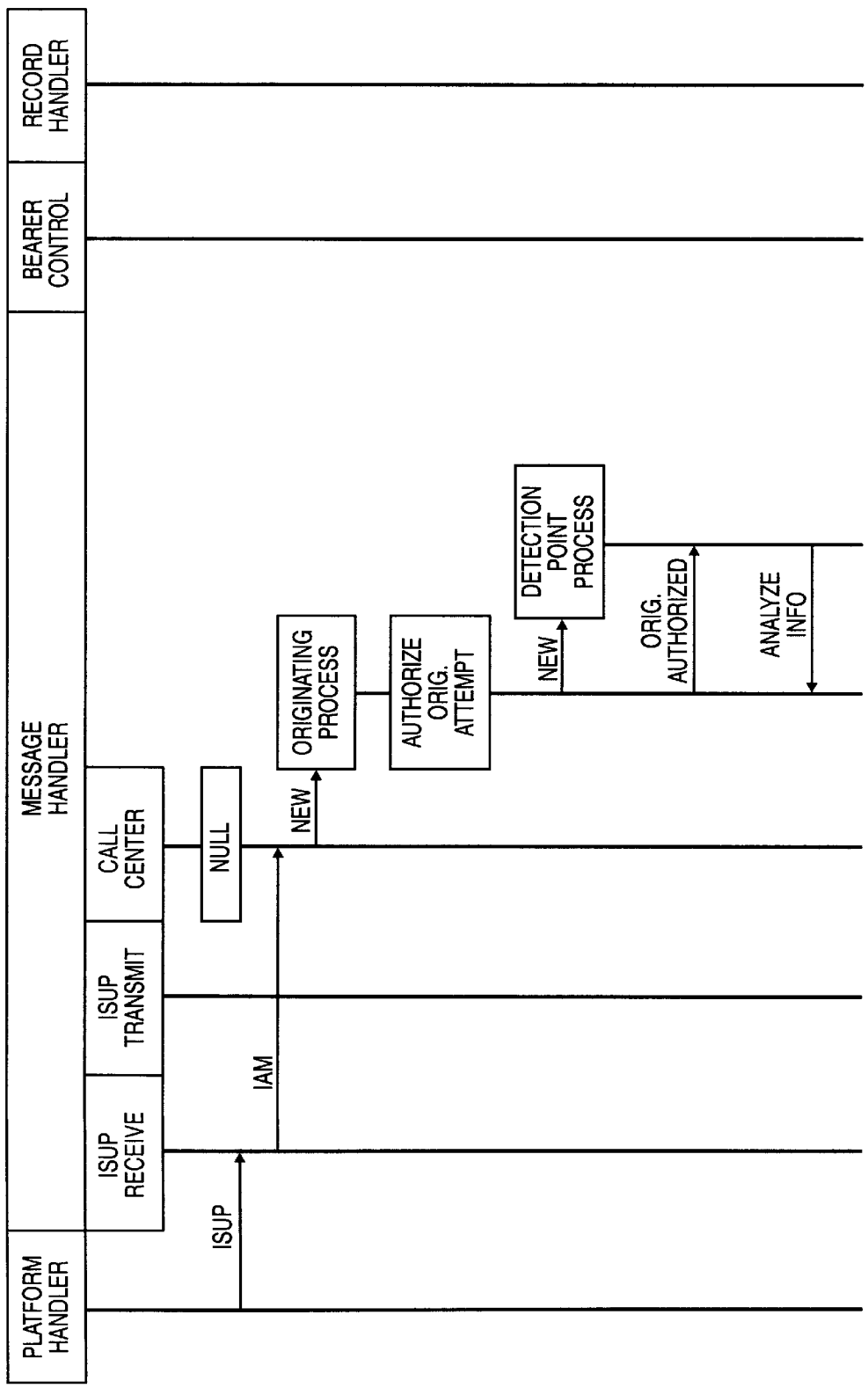
FIG. 8 is a message sequence chart for a version of the invention.

The sequence starts on FIG. 8 with an ISUP message at the platform handler. The platform handler forwards the message to the ISUP receive process of the message handler. If the ISUP message is an IAM, the ISUP receive process forwards the IAM to the call center. The call center had been in the "origination null" point-incall, but the IAM causes the call center to create an originating call process perameterized with contents of the IAM. The originating process then executes through the "authorize origination attempt" point-in-call. This typically entails ANI validation in a look-up table, but prior to the look-up, call information is checked to determine if ANI validation is required. For particular types of calls, i.e. "800" calls, origination is authorized without ANI validation.

Once origination has been authorized, the originating process creates a detection point process and transmits a signal to the detection point process that origination has been authorized. The detection point process returns a message instructing the origination process to execute through the "analyze information" point-in-call, although a detection point could be programmed at this point if desired. Continuing on to FIG. 9, "Analyze information" typically entails verifying that the dialed number is legitimate and checking call information for any applicable services. A few examples of a services are "800" and PCS. In this example, no services are required for the call—the call is a typical POTS call. Once the analysis has been accomplished, the originating process sends a "analyzed information" message to the detection point process. Typically, the detection point process returns a "resume" message to the originating process, but detection points could be programmed here if desired.

The resume message causes the origination process to execute through the "routing and alerting" point-in-call. This typically entails translating the dialed number to select a destination address. For example, the NPA-NXX of the dialed number could be used in a look-up table to yield the address of the terminating mux and the device that should receive the call from the mux. The origination process will also send a message to the call center to create an terminating call process. The terminating call process is provided with the identity of the originating process. The terminating process also creates a detection point process to handle the detection points it encounters. For purposes of clarity, this is indicated along the same line as the originating process detection point, although it should be understood that each process communicates with its corresponding detection point.

Figure 10:
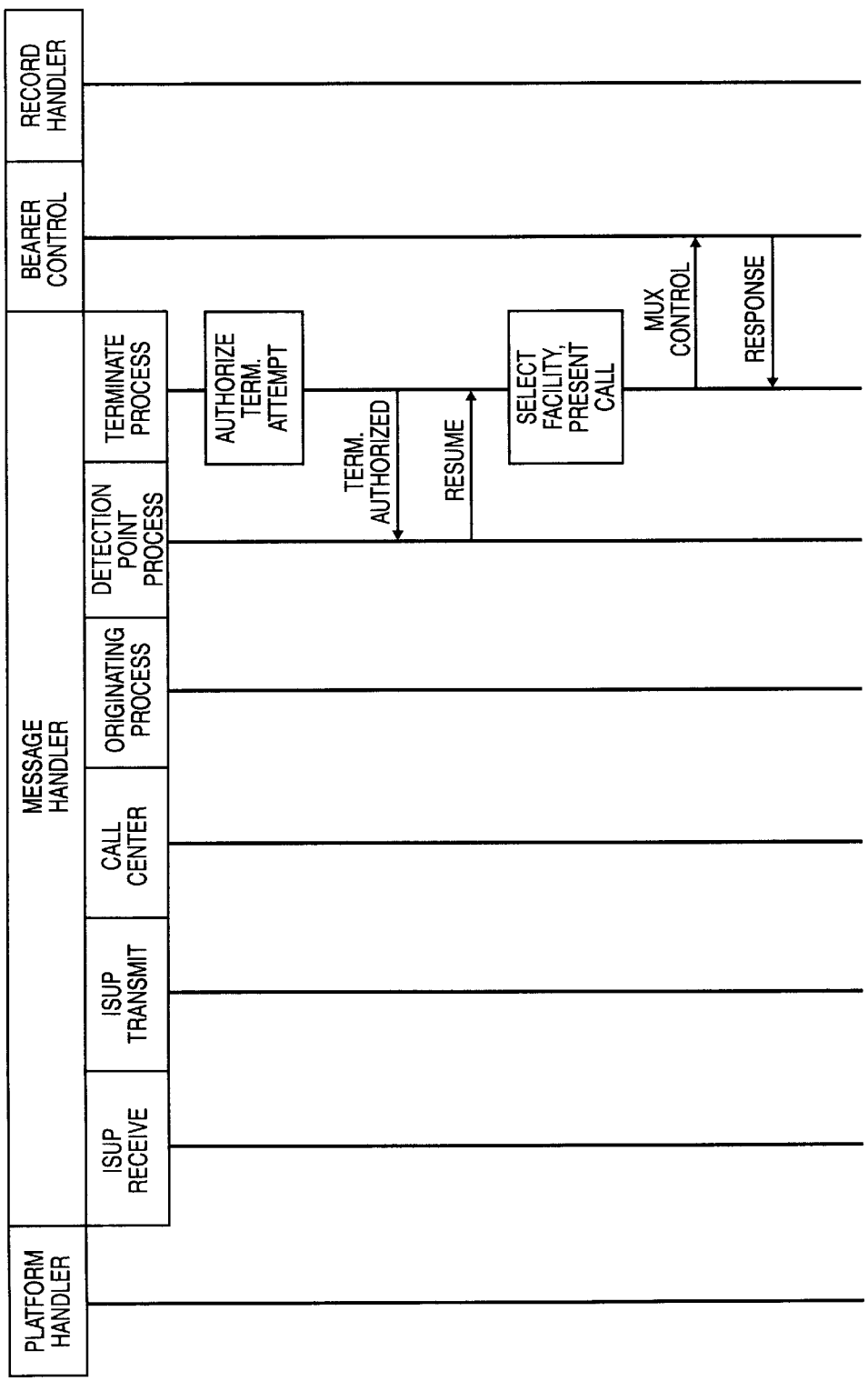
FIG. 10 is a message sequence chart for a version of the invention.
Figure 11:
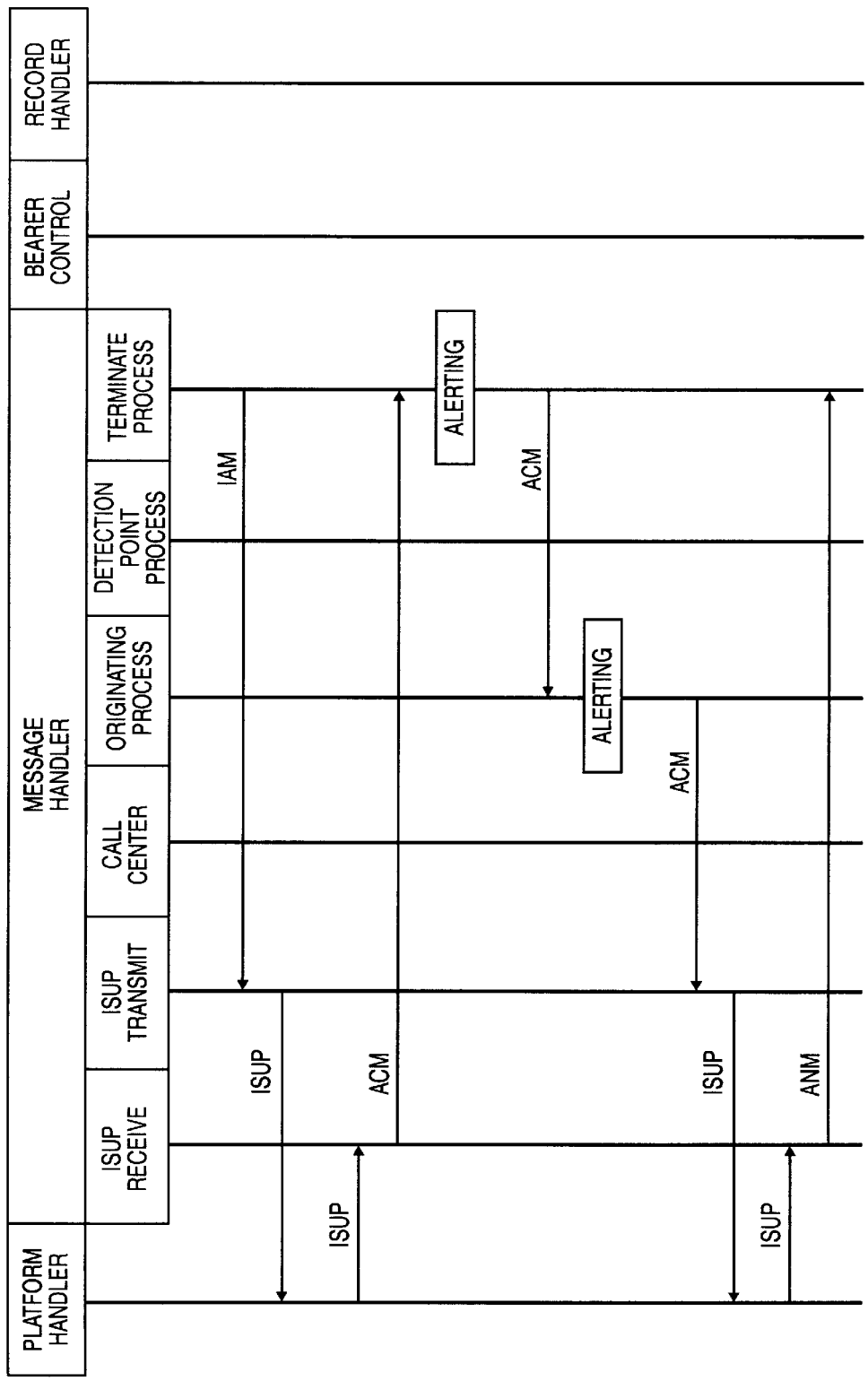
FIG. 11 is a message sequence chart for a version of the invention.
Figure 12:
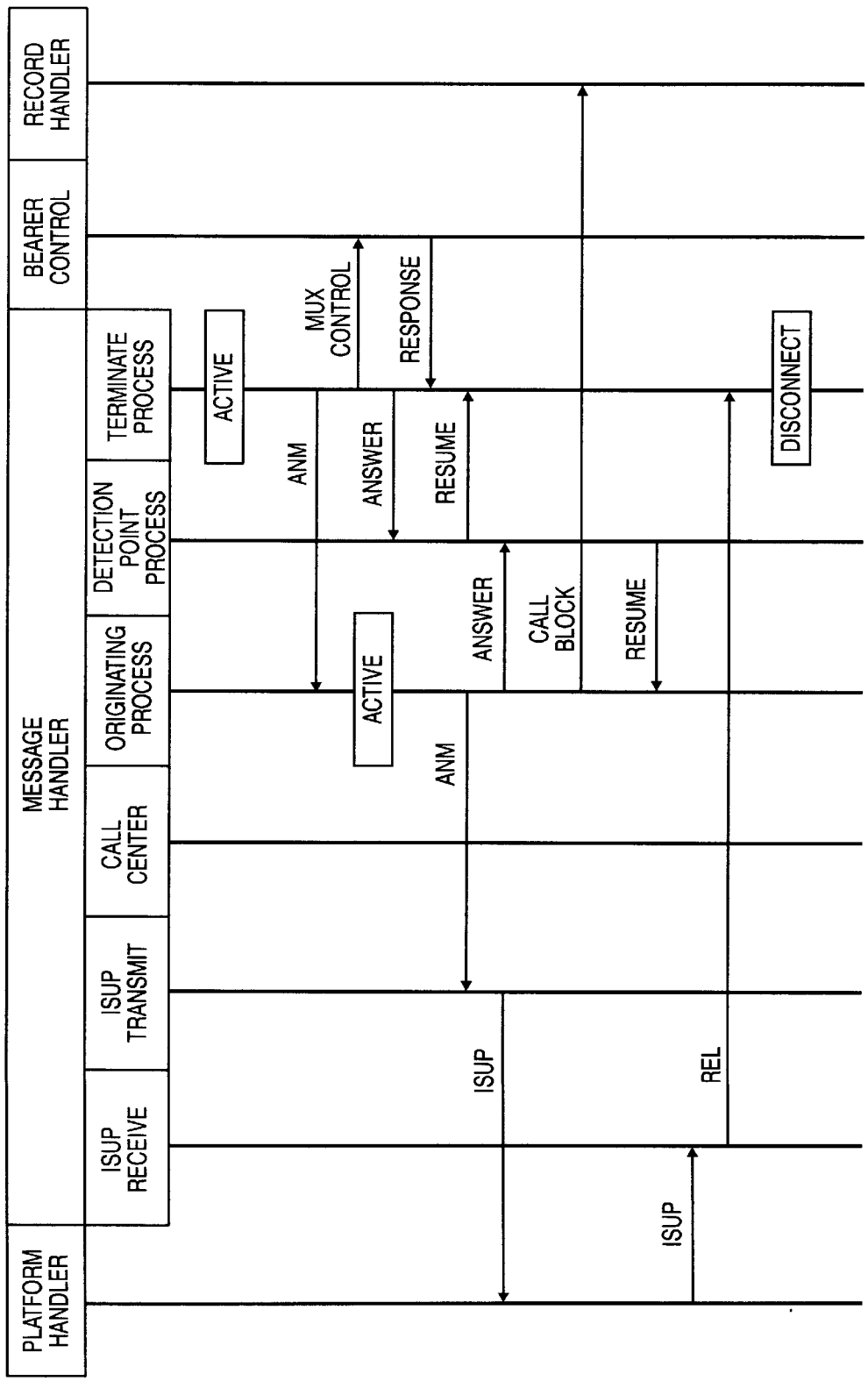
FIG. 12 is a message sequence chart for a version of the invention.
Figure 13:
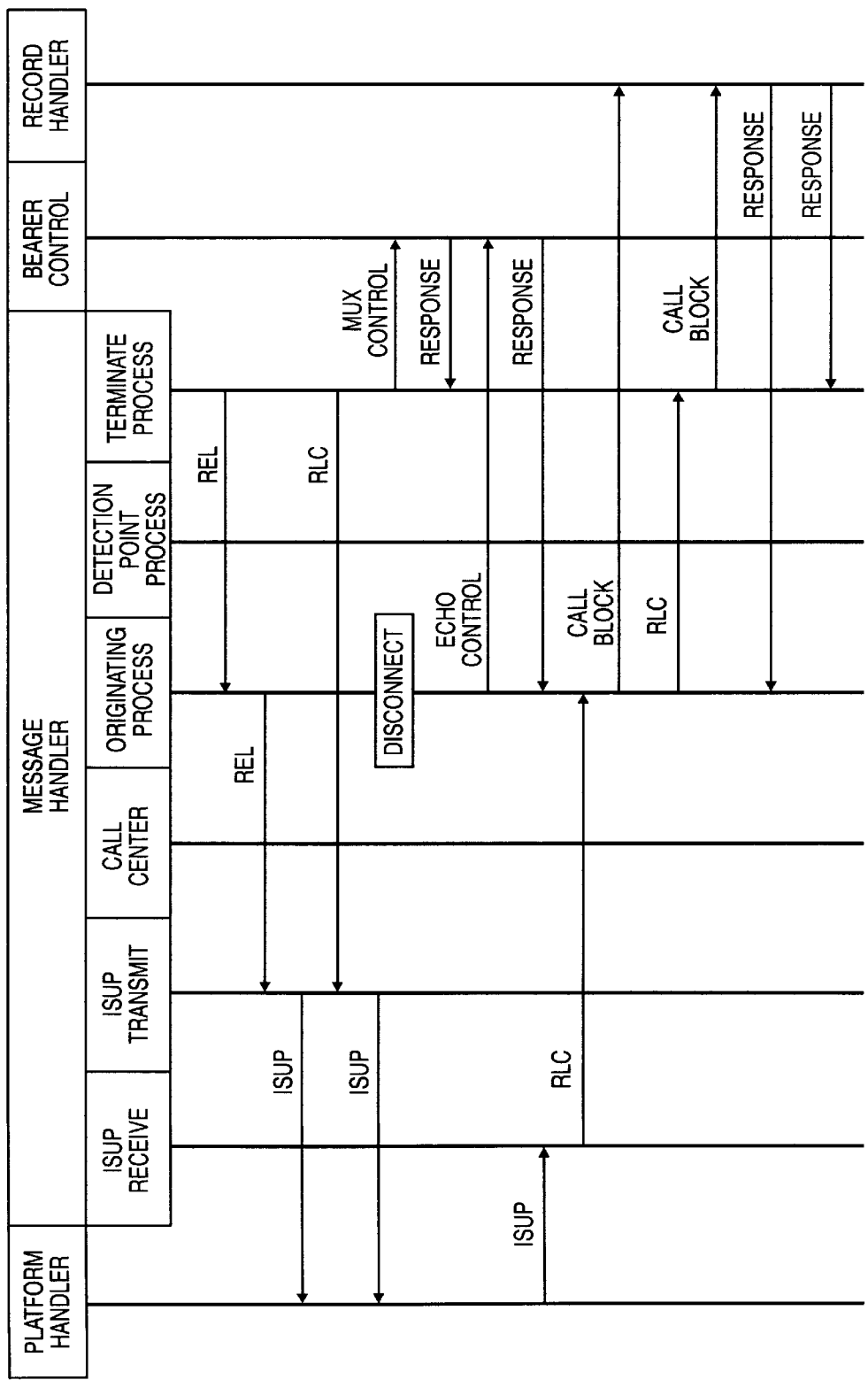
FIG. 13 is a message sequence chart for a version of the invention.
Figure 14:
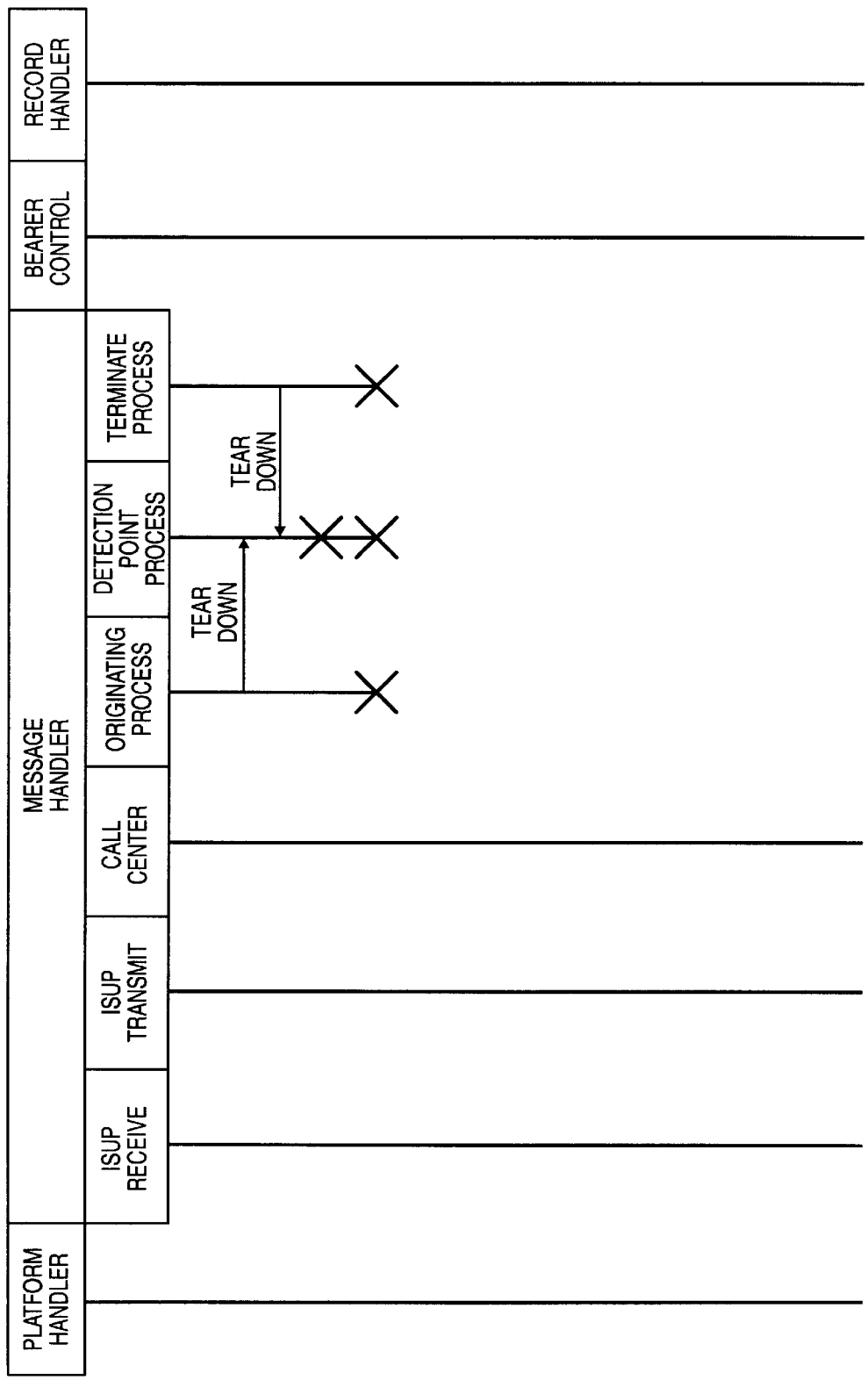
FIG. 14 is a message sequence chart for a version of the invention.

Continuing on to FIG. 10, the terminating process executes through the "authorize termination attempt" point-in-call. This typically entails verifying that an ATM connection to another mux can be attempted. For example, the CCM and the mux at the terminating end must be operational to handle the call. Once termination is authorized, an authorized message is sent to the detection point process, which returns a resume message to the termination manager (unless a detection point is programed into the detection point process.)

The terminating process will then execute through the "select facility and present call" point-in-call. This typically entails selecting the actual VPI/VCI and outbound connection for the call. The destination has already been specified during the "routing" point-in-call, so the VPI/VCI and point codes can be looked-up accordingly. The terminating process will then send a message to bearer control requesting mux control. Bearer control would then create a message for the originating mux identifying the connections and devices relevant to the call. Bearer control would respond that mux control was handled. Continuing on to FIG. 11, the terminating process would then construct an IAM for transmission to the downstream CCM at the terminating mux. As discussed above, this message could be coded such that the downstream CCM could skip detailed call processing. The IAM would be provided to the ISUP sender and a formatted IAM would be provided to the platform handler for subsequent transmission to the downstream CCM.

On a typical call, the next message that would be received by the CCM that is related to the call would be an Address Complete Message (ACM) signifying that the terminating end of the call had the information required to complete the call. This would be the case if the downstream-terminating CCM received the above-mentioned IAM, selected the actual DS0, and sent a subsequent IAM to the external device. As mentioned above, the specially coded IAM would cause the terminating CCM to merely select the outbound DS0, notify the terminating mux, and generate the IAM to send to the external connection. The external device would send an ACM back to the terminating CCM which would pass on an ACM to the originating CCM. These procedures at the terminating CCM are not depicted in the message sequence chart. The message sequence chart continues with the ACM arriving at the originating CCM.

The ISUP receive process would forward the ACM to the terminating process. The terminating process would execute through the "alerting" point-in-call and would send ACM information to the originating process, which would also execute through the "alerting" point-in-call. Alerting entails alerting the users that a connection is available i.e. ringing a telephone. Typically, no specific activity is required for "alerting", but detection points could be inserted into the process if desired. The originating process would forward an ACM to the ISUP sender which would provide a formatted ACM to the platform handler for subsequent transmission to devices at the origination side of the call.

On the typical call, an Answer Message (ANM) will be transferred from the terminating side of the call to the origination side of the call when the called party answers the phone. The ANM is received by the platform handler and forwarded to the ISUP receive process which forwards its version to the terminating process. Continuing on to FIG. 12, the terminating process executes though the "active" point-in-call and sends ANM information to the detection point process. Typically, the detection point process will return a resume message, although detection points could be included here if desired. The terminating process also sends a mux control message to bearer control to facilitate cut-through on the call at the mux. A acknowledgment response is sent back to the terminating process from bearer control. The terminating process also sends ANM information to the originating manager, which also executes through the "active" point-in-call. The originating process also sends an answer message to the detection point process and a partial call control block to the record handler. Typically, the detection point process will send a resume message back to the origination process. The originating process would forward an ANM to the ISUP sender which would provide a formatted ANM to the platform handler for subsequent transmission to devices at the origination side of the call. At this point, the call is in progress.

The message sequence continues with the receipt of a release message (REL) after the caller or called party hang up. As stated above, if the called party hangs up, a suspend message (SUS) is sent before the call is released, but if the caller hangs up, only an REL is sent. For clarity, the chart picks up with an REL arriving from the terminating side of the call. The REL is received by the platform handler and transferred to the ISUP receive process, which provides its version of the message to the terminating process. (Had the REL been from the originating side, it would have been provided to the originating process.) The terminating process executes through the "disconnect" point-in-call. Continuing on FIG. 13, the terminating process sends REL information to the originating process. The originating process would forward an REL to the ISUP sender which would provide a formatted REL to the platform handler for subsequent transmission to devices at the origination side of the call. In response to the REL, the terminating process will forward a Release Complete Message (RLC) to the ISUP sender which would provide a formatted RLC to the platform handler for subsequent transmission to the device that sent the REL. The RLC acknowledges the REL and signifies that the call connections may be torn down and re-used. The terminating process also sends a mux control message to bearer control to cause the relevant VPI/VCI to be torn down, and receives an acknowledgment response from bearer control. The originating process sends an echo control message to bearer control to ensure that the relevant echo canceller is enabled and receives and acknowledgment response from bearer control.

The next message will typically be an RLC in response to the REL sent to the originating side of the call. The RLC is received by the platform handler and forwarded to the ISUP receive process. ISUP receive provides its version of the message to the originating process. This causes the originating process to forward its final call control block to the record handler. The originating process also provides RLC information to the terminating process. This causes the terminating process to send its final call control block to the record handler. The record handler responds to each process with an acknowledgment response. Continuing on to FIG. 14, tear down messages are sent by the originating process and the terminating process to their respective detection point processes. Typically, no detection points will be programmed and the originating process, the terminating process, and the detection point processes will terminate and be cleared from the CCM.

Figure 9:
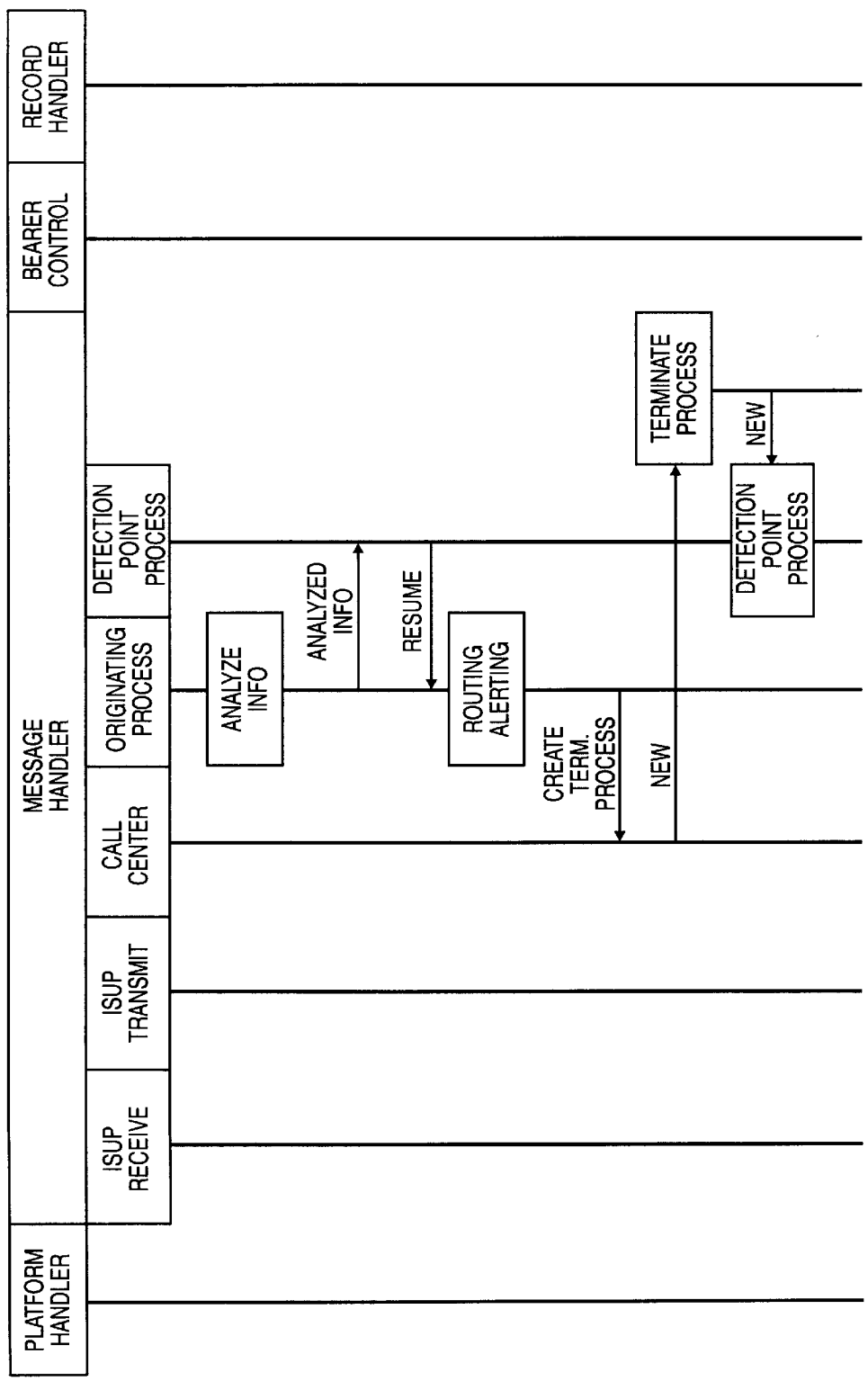
FIG. 9 is a message sequence chart for a version of the invention.
Figure 15:
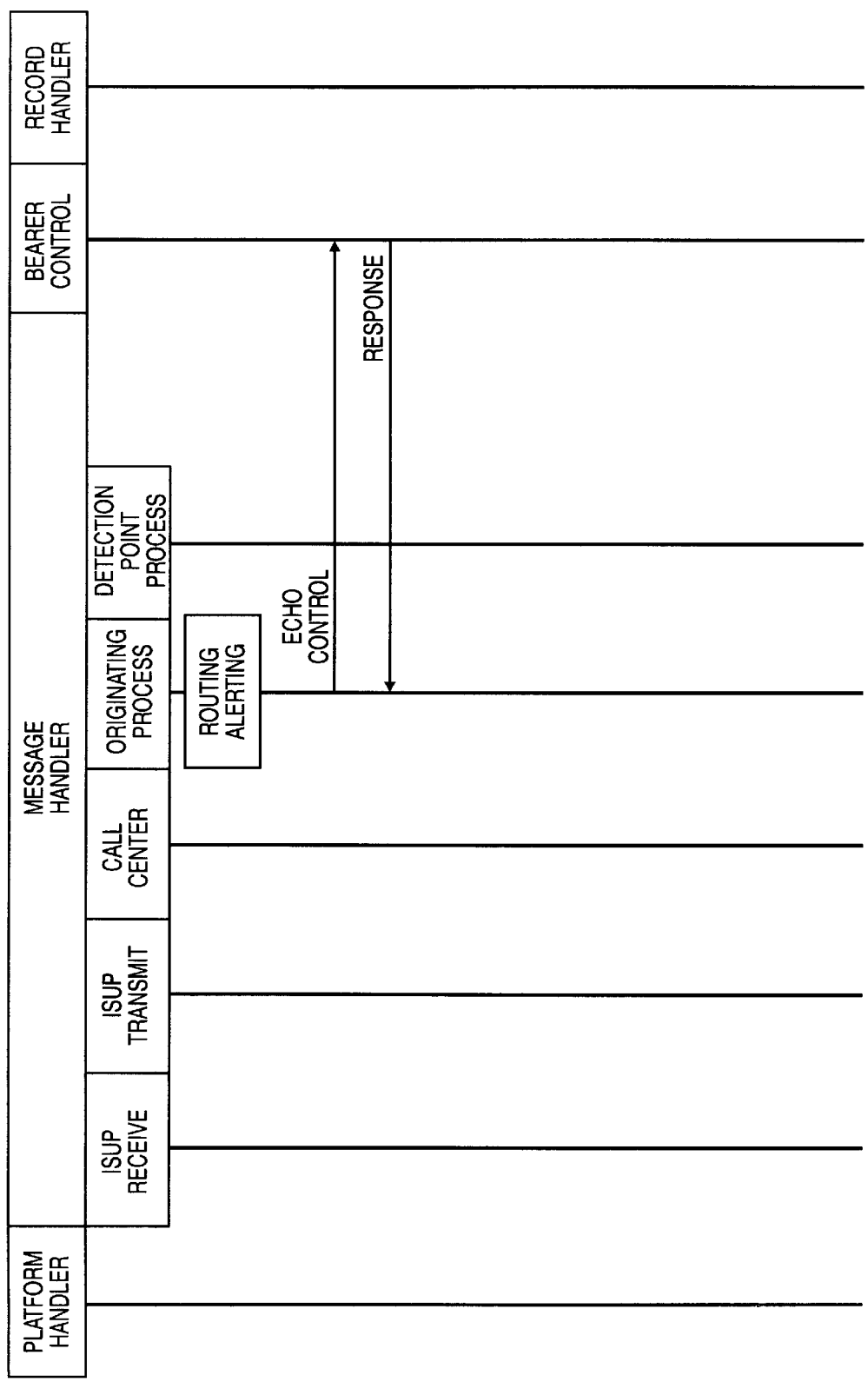
FIG. 15 is a message sequence chart for a version of the invention.

FIG. 15 depicts a modified excerpt from message sequence chart of FIG. 9. The modification is for a data call that requires the echo cancellation on the connection to be disabled. As shown, the message sequence chart picks up call processing at the "routing and alerting" point-in-call. Part of the execution through the "routing and alerting" point-in-call includes a check of IAM information to determine if echo cancellation should be disabled. If so, the originating process sends an echo control message to bearer control. Bearer control will send a message disabling the appropriate echo canceller. Bearer control also sends an acknowledgment response back to the originating process. Subsequent call processing continues as discussed above and the echo canceller is re-enabled after the call.

Figure 16:
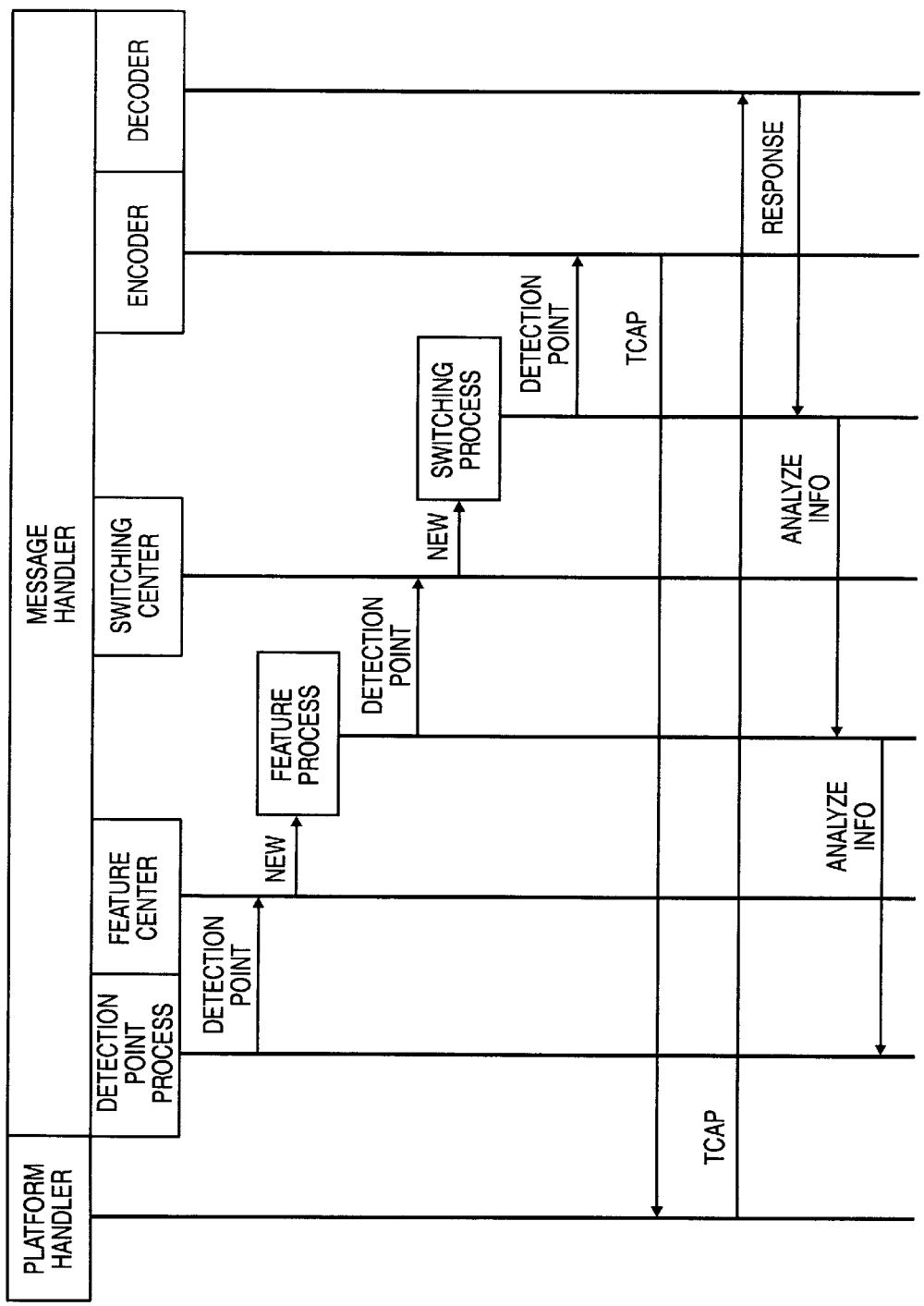
FIG. 16 is a message sequence chart for a version of the invention.

FIG. 16 also depicts a modified excerpt from the message sequence charts above. The modification is for a call that requires services. Services might include N00 or VPN calls, but many other services are known. In this embodiment, an SCP is accessed to provide information to implement the service. As shown, call processing picks up where the detection point process for either the originating process or the terminating process analyzes a detection point and determines that a service is required. Typically, this is done by examining the dialed number and the caller's number. Those skilled in the art are aware of how services can be determined from call information.

If it is determined that a service should be applied to the call, the detection point process sends detection point message to the feature center that causes the feature center to create an feature process. The feature process will be perameterized with call information and will send a detection point message to the switching center. In some embodiments, the feature process will choose between "IN" services and "non-IN" services and send the detection point message to the corresponding switching center. Upon receiving the message, the switching center creates a service process for each service to be applied to call. The service process formulates a request for service information and forwards it to the encoder of the SCF access manager. The encoder produces a TCAP message and transmits it over the appropriate link to a remote SCF. (possibly through the platform handler and/or the MTP interface). The remote SCF will return a response to the decoder. The response is formatted for the service process and sent to it. The service process takes the response and formulates an analyze information message that is transferred back through the feature process to the detection point process. The detection point process transfers the analyze information message to the applicable originating or terminating process. Subsequent call processing remains the same as discussed above. At call tear down, the feature process and the switching process are cleared from the CCM.

An example of the above scenario would be for an "800" call. The CCM would recognize that the "800" in the called number required service application. As a result, it would generate and transmit TCAP query to an SCP requesting an "800" translation. The SCP would process the query and translate the "800" number into a POTS number. The SCP would return the POTS number to the requesting CCM. The CCM would then process the POTS number as it would for a standard POTS call.

In some embodiments, the CCM processes SS7 signaling messages to accomplish the following functions: validation, routing, billing, and echo cancellation. SS7 messages are well known in the art. The following sections discuss SS7 processing, but those skilled in the art will recognize variations that are also contemplated by the invention. In SS7, the routing labels of the messages are used to correlate messages to calls. Contemporaneous messages with the same OPC, DPC, and CIC relate to the same call.

To validate a call, the routing label of messages should be checked. The Service Indicator should be checked to distinguish between an incoming message from outside of the network or a message from a network CCM. The Destination Point Code is screened to ensure the destination of the SS7 message is actually destined for the CCM. The Originating Point Code is screened to ensure the originating point code is allowed in the CCM. The Message Type is screened to ensure that the type of message is allowed in the CCM and that there are no protocol violations associated with the message.

Both the Circuit Reservation Message (CRM) and the IAM should have the Satellite Indicator screened to ensure that the limit on the number of Satellites in a circuit has not been exceeded. This will be on a trunk group by trunk group basis. The REL automatic congestion level will be screened to see if congestion arises. The CCM should then control calls to the associated network elements until the congestion abates. For non-call associated messages, the circuit group supervision message type indicator will be screened to compare the state of the circuits with the instructions incoming in the messages.

The IAM will receive additional treatment for validation. Information Transfer Capability will be screened to ensure that the connection for the call is capable of handling the transfer rate requested. The Coding Standard will be screened to ensure that the standard is coded 00. All others will be rejected. Transfer Mode will be screened to ensure that the mode is coded 00 for 64 Kbit/second calls. User Layer Protocol ID and the Rate field will be screened to ensure that there is no rate adaptation required for the call. The Network ID Plans and Digits, will be screened to ensure that the carrier identification field and the transit network carrier identification field is in the correct format. The Circuit Code will be screened to allow callers with the correct means of dialing to access the network.

The CCM will check the Hop Counter in the IAM to determine if it has reached its limit as set by this field (range 10 to 20 with a default of 20). If it has not, the CCM will increment the parameter. If it has reached the determined count, the CCM will send a release message back with a cause of "exchange routing error" to tell the preceding switch that the IAM has reached its limit in hops. If this field is left blank, the CCM will not increment the counter parameter and pass the IAM unchanged.

The IAM Called Party Number field should be handled as follows for validation. Nature of Address will tell the CCM what type of number was dialed for the called number. The screening of this field will be for a non-NPA number. If that occurs, the CCM will need to add the NPA from the Trunk Group to the call control block. Numbering Plan will be screened to check what type of plan the incoming called party number uses. The only allowable plans are Unknown and ISDN numbering plans. All others should be disallowed. Digits Field will be screened for the number of digits using the Nature of Number, Odd/Even, and Digits Fields to determine the correct number of digits.

The IAM Calling Party Number and Charge Number fields should be handled as follows for validation. Nature of Address will be screened to ensure that the calling party's number is in the proper format. Presentation Allowed/Restricted will be screened to check for N00 calling. Numbering Plan will be checked to ensure that the numbering plan is set at either unknown or ISDN numbering plan. Digits Field will be checked to ensure that there is enough digits for an ANI that can be billed. These digits will be validated in an ANI table for call authorization.

Routing is primarily accomplished by processing the IAM. Called Party Number Nature of Address, Digits—This will tell the CCM what type of call this is. It will differentiate 0+, test calls, and International numbers from normal 1+ calls. The Calling Party's Category tells the CCM that the call is a test call with different routing than a normal call. The Carrier Identification Plan will be used to determine if the CCM receives the Carrier Identification Code of another carrier, since the CCM may wish to route the call based on the subscribers choice of carriers. The IAM Carrier Selection Information is used to route the call based on whether the subscriber was presubscribed or dialed the carrier access number. The IAM Originating Line Information will enable the CCM to route based on what type of originating line is being used for this call. An example is if a payphone makes a 1+ call, the CCM will be able to route the call directly to an operator for billing arrangements. The IAM Transit Network Selection fields will indicate the Carrier Identification Code of the International Carrier that is requested by the subscriber, so the CCM can route the international call to the correct switch. The Circuit Code will tell the CCM how the code was dialed. If the subscriber dialed an access code for a different international carrier, the CCM could route the call to an operator center for processing.

The IAM Called Party Number fields are handled as follows for routing. Nature of Address Indicator tells what type of call is being requested. This will include 0+ and 0– calls, international calls (operator and non operator calls), cut through, and 950 types of calls. With this information, the CCM can route the call directly to the international gateway or operator center without looking at the rest of the message. For normal 1+ calls, the Odd/Even field will be used with the digits fields to determine the number of digits. Numbering Plan field will be used to route calls differently if it has a "Private Numbering Plan" value in the field. Digits Field will be the digits that will be used to route the call through the network using table look-ups. Typically, the digits field houses the dialed number.

Billing will be based on the Call Control Blocks (CCBs) created by the call processes. A portion of these records are transferred from messages received by the CCM. The CCBs are discussed above. When the Calling Party Number is present in the IAM and there is no Charge Number present, the Calling Party Number is used to bill the call. If the Charge Number is present in the same message, then the Charge Number will be used for billing instead of the Calling Party Number. Various messages need to be tracked to measure the duration of the call. These include the IAM, ACM, ANM, SUS, REL, and RLC. The causes associated with these messages should also be considered.

As to echo control, messages should be examined to determine if either side of the call—originating or terminating—has already handled echo control. This can be done by looking at the Echo Suppresser Indicator in the Nature of Connection Indicators Parameter of the CRM or the IAM, or the Echo Control Device Indicator in the Backward Call Indicators Parameter of the ACM or the Call Progress Message (CPM). If no echo control has been provided, the CCM will implement echo control depending on the Information Transfer Capability in the User Service Indicator Parameter of the IAM.

The invention allows switching over an ATM fabric on a call by call basis. This allows efficient high capacity virtual connections to be exploited. Advantageously, the invention does not require signaling capability in an ATM switch. The invention does not require call processing capability in an ATM switch. This enables networks to implement ATM switching without these sophisticated ATM switches that support high volumes of calls. It also avoids the cost of these switches. The invention fully supports voice traffic and non-voice traffic. The invention supports services, such as N00, VPN, personal/terminal mobility, and voice massaging without requiring the service capability in an ATM switch. Relying on ATM cross-connects is advantageous because ATM cross-connects are farther advanced than ATM switches, and the cross-connects require less administrative support.

Those skilled in the art will appreciate that variations from the specific embodiments disclosed above are contemplated by the invention. The invention should not be restricted to the above embodiments, but should be measured by the following claims.

We claim:

1. A method of operating a telecommunications system to provide a call with a virtual connection wherein a user places the call by transmitting user information to the telecommunications system over a particular connection for the call and by sending signaling for the call to the telecommunications system, wherein the system comprises an ATM interworking multiplexer and a signaling processor coupled to the ATM interworking multiplexer, the method comprising:

receiving the signaling for the call into the signaling processor;

processing the signaling for the call in the signaling processor to select the virtual connection;

generating a control message in the signaling processor to identify the particular connection and the selected virtual connection;

transmitting the control message to the ATM interworking multiplexer;

receiving the user information for the call from the particular connection into the ATM interworking multiplexer;

converting the user information from the particular connection into ATM cells that identify the selected virtual connection in the ATM interworking multiplexer in response to the control message; and transmitting the ATM cells from the ATM interworking multiplexer over the selected virtual connection.

2. A method of operating a telecommunications system to provide a call with a virtual connection wherein a user places the call by transmitting user information to the telecommunications system over an access connection for the call by sending signaling for the call to the telecommunications system, wherein the system comprises a plurality of access connections, a plurality of ATM interworking multiplexers connected to the access connections, a plurality of signaling processors linked to each other and coupled to the ATM interworking multiplexers, and an ATM cross-connect system connected to the ATM interworking multiplexers and configured to provide a plurality of virtual connections between the ATM interworking multiplexers, the method comprising:

provides the user with a first access connection to a first ATM interworking multiplexer;

receiving a first signal for the call into a first signaling processor;

processing the first signal in the first signaling processor to select a virtual connection for the call from the first ATM interworking multiplexer through the ATM cross-connect system to a second ATM interworking multiplexer and to select a destination for the call beyond the second ATM interworking multiplexer;

generating a second signal in the first signaling processor that identifies the selected virtual connection and the destination;

transmitting the second signal to the second signaling processor;

processing the second signal in the second signaling processor to select a second access connection for the call from the second ATM interworking multiplexer to the destination;

generating a first control message in the first signaling processor that identifies the first access connection and the selected virtual connection;

transmitting the first control message to the first ATM interworking multiplexer;

generating a second control message in the second signaling processor that identifies the selected virtual connection and the second access connection;

transmitting the second control message to the second ATM interworking multiplexer;

receiving the user information for the call from the first access connection into the first ATM interworking multiplexer;

placing the user information from the first access connection into ATM cells that identify the selected virtual connection in the first ATM interworking multiplexer in response to the second control message;

transmitting the ATM cells from the first ATM interworking multiplexer through the ATM cross-connect system over the selected virtual connection to the second ATM interworking multiplexer;

converting the ATM cells that identify the selected virtual connection into user information suitable for the second access connection in the second ATM interworking multiplexer in response to the second control message; and transmitting the user information from the second ATM interworking multiplexer over the second access connection.

3. The method of claim 2 wherein selecting the destination comprises selecting a trunk group.

4. The method of claim 3 wherein selecting the second access connection comprises selecting a DS0 within the trunk group.

5. The method of claim 2 wherein transmitting the second control message to the second signaling processor comprises transmitting a Signaling System #7 (SS7) Narrowband Integrated Digital Services User Part (N-ISUP) Initial Address Message (IAM) using a Message Transfer Part level 3 MTP3)—Signaling ATM Adaption Layer (SAAL)—ATM protocol stack.

6. The method of claim 2 wherein generating the second signal in the first signaling processor comprises generating a Signaling System #7 (SS7) Initial Address Message (IAM) that identifies the selected virtual connection and the route in a Circuit Identification Code (CIC).

7. The method of claim 2 wherein generating the second signal in the first signaling processor comprises generating an SS7 IAM that identifies that the destination has been selected in a Service Code.

8. A telecommunications system to provide a call received over a first connection with a virtual connection in response to signaling for the call, the system comprising:

signaling processor operable to receive and process the signaling for the call to select the virtual connection for the call, and to generate and transmit a control message that identifies the first connection and the selected virtual connection;

an ATM interworking multiplexer operable to receive the control message and the user information from the first connection, convert the user information into ATM cells that identify the selected virtual connection in response to the control message, and to transmit the ATM cells from the ATM interworking multiplexer over the selected virtual connection.

9. The system of claim 8 further comprising an ATM cross-connect system connected to the ATM interworking multiplexer and configured to provide a plurality of virtual connections to the ATM interworking multiplexer.

* * * * *

UNITED STATES PATENT AND TRADEMARK OFFICE
CERTIFICATE OF CORRECTION

PATENT NO : 6,081,525
DATED : June 27, 2000
INVENTOR(S) : Joseph Michael Christie, et al.

It is certified that error appears in the above-identified patent and that said Letters Patent are hereby corrected as shown below:

On page 1, Column 2, of Section [56] References Cited, OTHER PUBLICATIONS, delete lines 28 through 29 "U.S. application No. 09/082,165, filed May 20, 1998," through "U.S. application No. 09/082,040, filed May 20, 1998."

On page 2, Column 2, of Section [56] References Cited, OTHER PUBLICATIONS, delete lines 66 through 72 "U.S. application No. 09/082,045, filed May 20, 1998," through "U.S. application No. 09/081,891, filed May 20, 1998."

On page 3, Column 1, of Section [56] References City, OTHER PUBLICATIONS, delete lines 1 through 37 "U.S. application No. 09/082,181, filed May 20, 1998," through "U.S. application No. 09/058,642, filed April 10, 1998."

Signed and Sealed this

Eighth Day of May, 2001

NICHOLAS P. GODICI

*Attest:*

*Attesting Officer*

*Acting Director of the United States Patent and Trademark Office*

UNITED STATES PATENT AND TRADEMARK OFFICE
CERTIFICATE OF CORRECTION

PATENT NO.    : 6,081,525
DATED         : June 27, 2000
INVENTOR(S)   : Christie et al.

It is certified that error appears in the above-identified patent and that said Letters Patent is hereby corrected as shown below:

Title page,
Item [63], Related U.S. Application Data, delete lines 29 through 32 "and a continuation-in-part of application No. 08/525,050, Sept. 8, 1995, which is a continuation-in-part of application No. 08/238,605."

Signed and Sealed this

Twenty-third Day of October, 2001

Attest:

NICHOLAS P. GODICI
Attesting Officer    Acting Director of the United States Patent and Trademark Office